US012628010B2

(12) United States Patent
Sim et al.

(10) Patent No.: US 12,628,010 B2
(45) Date of Patent: May 12, 2026

(54) ADAPTIVE SELF-INTERFERENCE MITIGATION RESOURCES FOR FULL-DUPLEX COMMUNICATION

(71) Applicant: QUALCOMM Incorporated, San Diego, CA (US)

(72) Inventors: Min Soo Sim, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 17/886,424

(22) Filed: Aug. 11, 2022

(65) Prior Publication Data

US 2024/0056843 A1      Feb. 15, 2024

(51) Int. Cl.
| | |
|---|---|
| *H04W 24/08* | (2009.01) |
| *H04L 5/00* | (2006.01) |
| *H04W 72/044* | (2023.01) |

(52) U.S. Cl.
CPC ........... *H04W 24/08* (2013.01); *H04L 5/0098* (2013.01); *H04W 72/044* (2013.01)

(58) Field of Classification Search
CPC .................................................. H04W 24/08
See application file for complete search history.

(56) References Cited

U.S. PATENT DOCUMENTS

| | | | | |
|---|---|---|---|---|
| 11,271,699 | B1 * | 3/2022 | Eyuboglu ............ | H04J 11/0079 |
| 2015/0200764 | A1 * | 7/2015 | Lin ................... | H04W 52/0212 |
| | | | | 370/278 |

| | | | | |
|---|---|---|---|---|
| 2016/0127114 | A1 | 5/2016 | Kim et al. | |
| 2016/0323830 | A1 * | 11/2016 | Kim ...................... | H04L 5/0048 |
| 2017/0005776 | A1 * | 1/2017 | Kim ..................... | H04W 72/541 |
| 2019/0260486 | A1 * | 8/2019 | Kang ................... | H04L 5/0007 |

(Continued)

FOREIGN PATENT DOCUMENTS

| | | | | |
|---|---|---|---|---|
| CN | 111867107 | A | * 10/2020 | ......... H04W 72/541 |
| WO | WO-2022056819 | A1 | 3/2022 | |

OTHER PUBLICATIONS

International Search Report and Written Opinion—PCT/US2023/071366—ISA/EPO—Oct. 27, 2023.

*Primary Examiner* — Abdeltif Ajid
(74) *Attorney, Agent, or Firm* — QUALCOMM Incorporated

(57)      ABSTRACT

Methods, systems, and devices for wireless communications are described. The described techniques generally provide for a wireless device (e.g., a user equipment (UE), a network entity) to use a set of resources for mitigating self-interference when communications in a full-duplex mode. For example, a UE may request a set of resources for performing a self-interference mitigation procedure. The UE may receive a configuration of the requested set of resources and transmit one or more self-interference measurement signals via the set of resources (e.g., in the absence of transmissions by other devices). In some examples, a network entity may transmit an indication of periodic resources, semi-persistent resources, or both, for a self-interference mitigation procedure performed by the network entity. In response, one or more UEs may cancel uplink transmissions that overlap with the indicated resources, such that the self-interference mitigation procedure is performed in the absence of uplink signals.

28 Claims, 20 Drawing Sheets

(56)  References Cited

U.S. PATENT DOCUMENTS

| | | | | |
|---|---|---|---|---|
| 2021/0219305 | A1* | 7/2021 | Yum ..................... | H04B 17/336 |
| 2021/0307006 | A1* | 9/2021 | Raghavan ............. | H04L 5/0094 |
| 2021/0376941 | A1 | 12/2021 | Zhang et al. | |
| 2021/0377957 | A1* | 12/2021 | Zhang ................... | H04L 5/1461 |
| 2022/0029761 | A1* | 1/2022 | Su ......................... | H04L 5/0028 |
| 2022/0200777 | A1* | 6/2022 | Lee .......................... | H04L 5/16 |
| 2022/0225124 | A1* | 7/2022 | Suh .......................... | H04L 5/14 |
| 2024/0080115 | A1* | 3/2024 | Guo ..................... | H04B 17/345 |

* cited by examiner

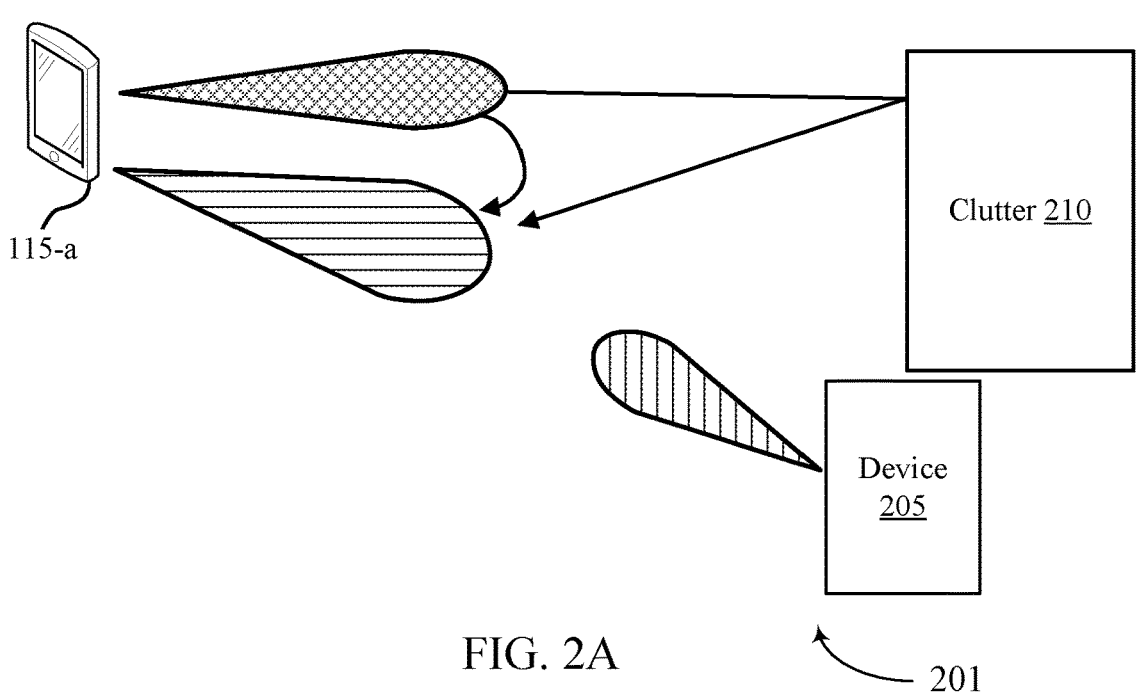
FIG. 2A
201
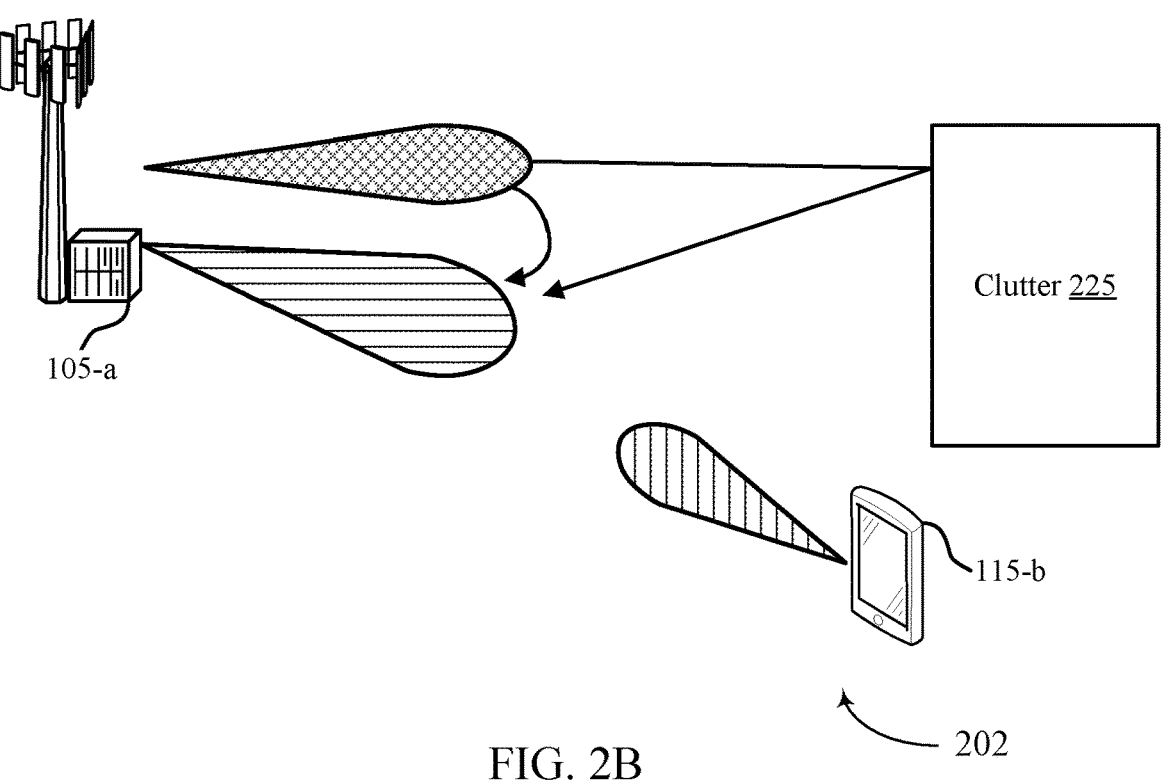
FIG. 2B
202
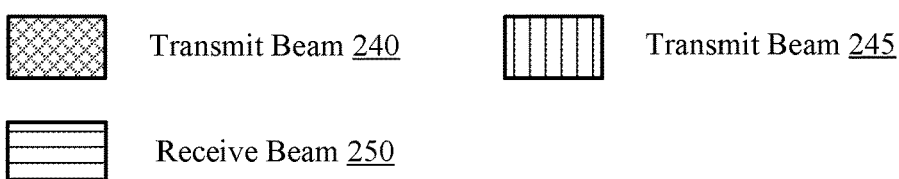
Transmit Beam 240     Transmit Beam 245
Receive Beam 250

301

302

610

620

615

605

600

130

105

115

Network
Entity

Transceiver

1310

Antenna

1315

Communications
Manager

1320

Memory

Code

1330

1325

1340

Processor

1335

1305

1300

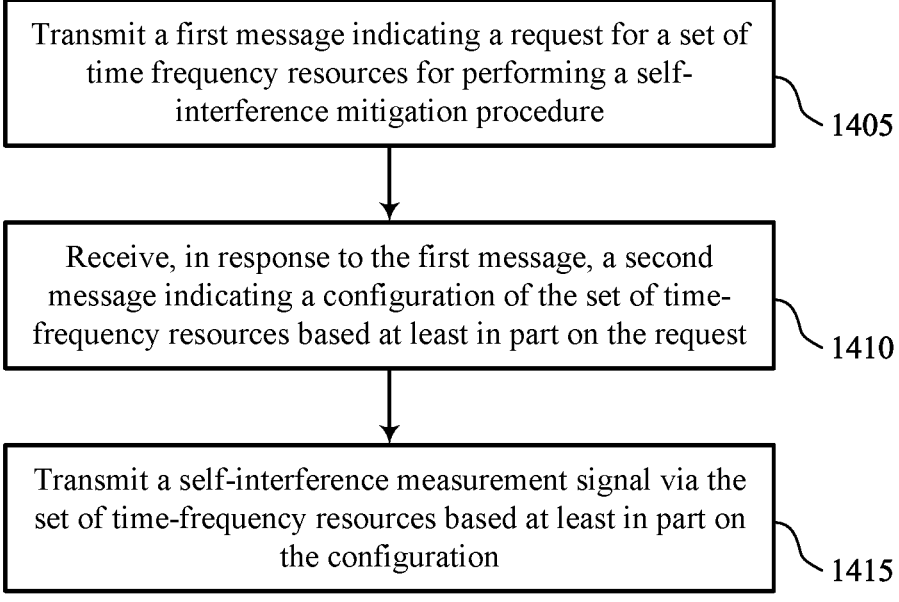

Transmit a first message indicating a request for a set of time frequency resources for performing a self-interference mitigation procedure

1405

Receive, in response to the first message, a second message indicating a configuration of the set of time-frequency resources based at least in part on the request

1410

Transmit a self-interference measurement signal via the set of time-frequency resources based at least in part on the configuration

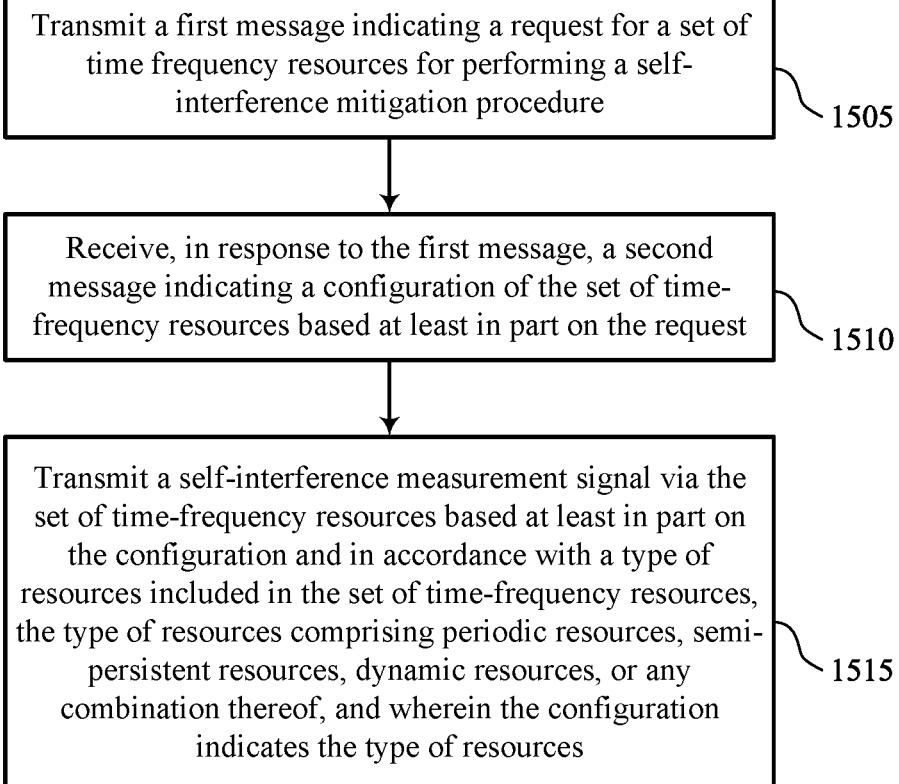

Transmit a first message indicating a request for a set of time frequency resources for performing a self-interference mitigation procedure

1505

Receive, in response to the first message, a second message indicating a configuration of the set of time-frequency resources based at least in part on the request

1510

Transmit a self-interference measurement signal via the set of time-frequency resources based at least in part on the configuration and in accordance with a type of resources included in the set of time-frequency resources, the type of resources comprising periodic resources, semi-persistent resources, dynamic resources, or any combination thereof, and wherein the configuration indicates the type of resources

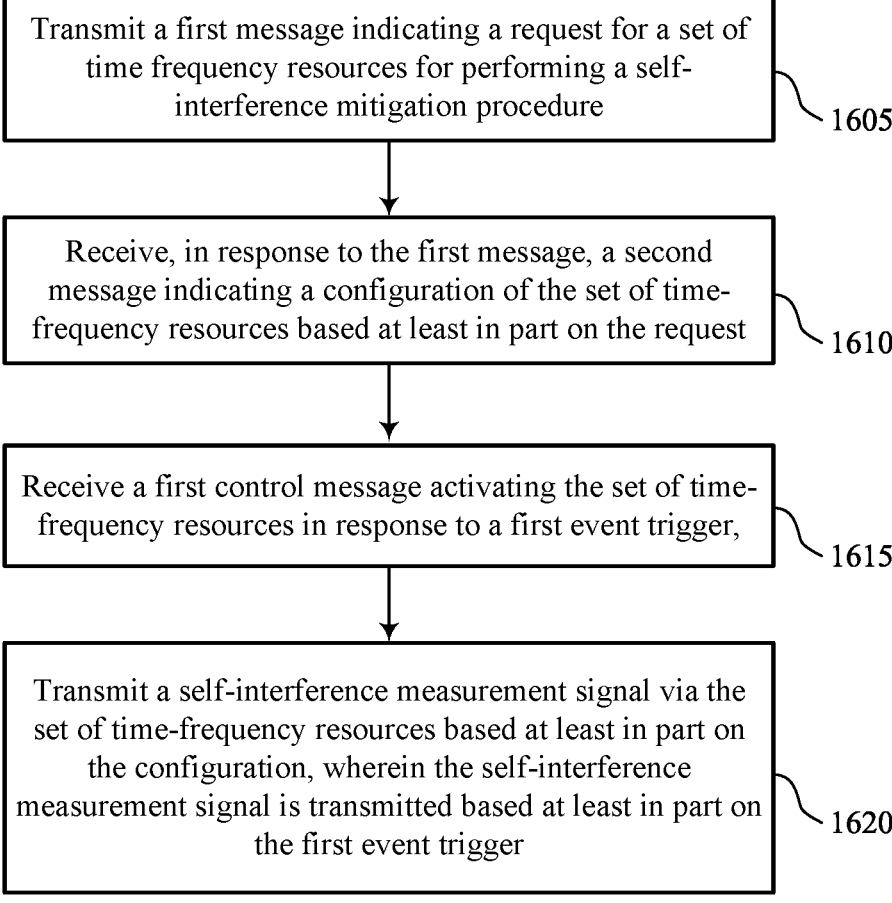

Transmit a first message indicating a request for a set of time frequency resources for performing a self-interference mitigation procedure ⟩ 1605

Receive, in response to the first message, a second message indicating a configuration of the set of time-frequency resources based at least in part on the request ⟩ 1610

Receive a first control message activating the set of time-frequency resources in response to a first event trigger, ⟩ 1615

Transmit a self-interference measurement signal via the set of time-frequency resources based at least in part on the configuration, wherein the self-interference measurement signal is transmitted based at least in part on the first event trigger ⟩ 1620

Receive, from a network entity, a message indicating a configuration of a set of time-frequency resources for a self-interference mitigation procedure, the set of time-frequency resources comprising periodic resources or semi-persistent resources, or both

1705

Cancel one or more uplink transmissions from the UE based at least in part on the configuration, wherein time-frequency resources associated with the one or more uplink transmissions at least partially overlap with the set of time-frequency resources

1710

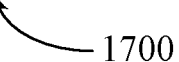

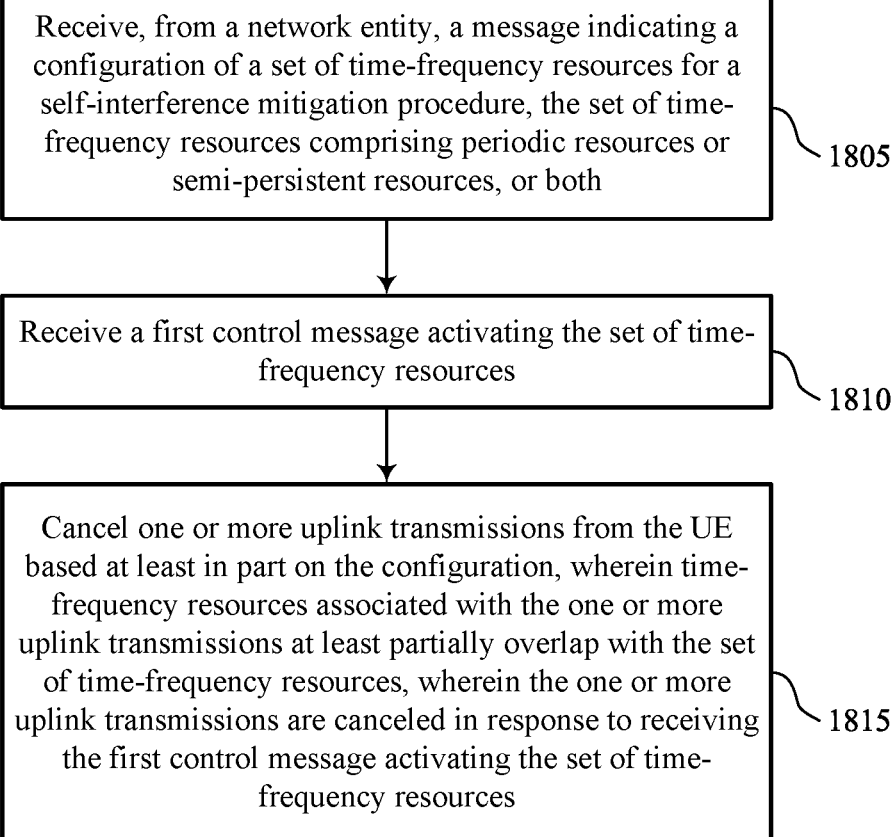

Receive, from a network entity, a message indicating a configuration of a set of time-frequency resources for a self-interference mitigation procedure, the set of time-frequency resources comprising periodic resources or semi-persistent resources, or both

1805

Receive a first control message activating the set of time-frequency resources

1810

Cancel one or more uplink transmissions from the UE based at least in part on the configuration, wherein time-frequency resources associated with the one or more uplink transmissions at least partially overlap with the set of time-frequency resources, wherein the one or more uplink transmissions are canceled in response to receiving the first control message activating the set of time-frequency resources

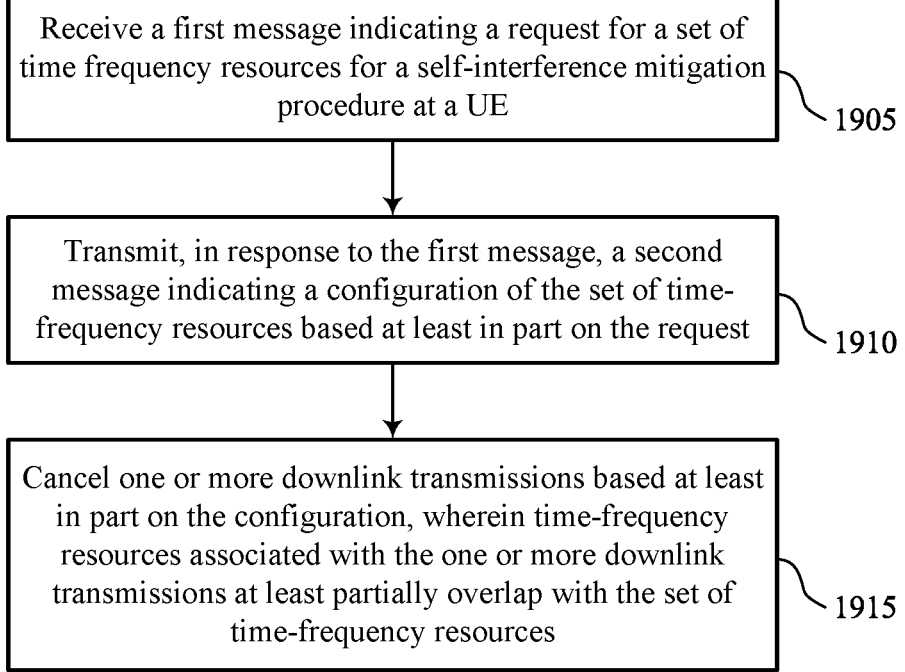

Receive a first message indicating a request for a set of time frequency resources for a self-interference mitigation procedure at a UE

1905

Transmit, in response to the first message, a second message indicating a configuration of the set of time-frequency resources based at least in part on the request

1910

Cancel one or more downlink transmissions based at least in part on the configuration, wherein time-frequency resources associated with the one or more downlink transmissions at least partially overlap with the set of time-frequency resources

Figure 20:
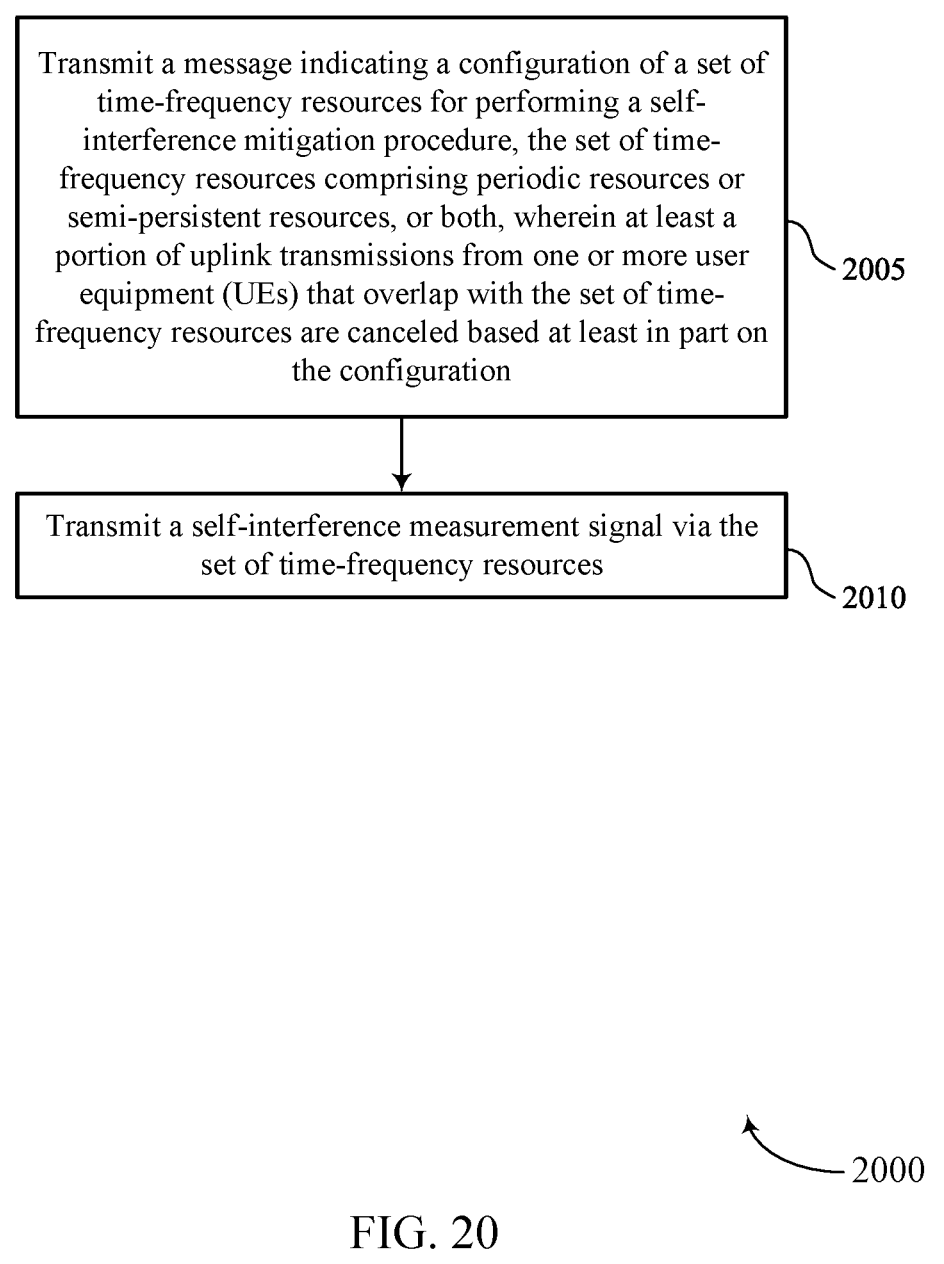

Transmit a message indicating a configuration of a set of time-frequency resources for performing a self-interference mitigation procedure, the set of time-frequency resources comprising periodic resources or semi-persistent resources, or both, wherein at least a portion of uplink transmissions from one or more user equipment (UEs) that overlap with the set of time-frequency resources are canceled based at least in part on the configuration

╲ 2005

Transmit a self-interference measurement signal via the set of time-frequency resources

ADAPTIVE SELF-INTERFERENCE MITIGATION RESOURCES FOR FULL-DUPLEX COMMUNICATION

FIELD OF TECHNOLOGY

The following relates to wireless communications, including adaptive self-interference mitigation resources for full-duplex communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may operate according to a full-duplex mode. That is, the wireless device may receive signaling from one or more other wireless devices while simultaneously transmitting signaling to one or more other devices. In some cases, a communicating in a full-duplex mode may be affected by self-interference (e.g., interference from a transmission antenna to a reception antenna of a same device).

SUMMARY

The described techniques relate to improved methods, systems, devices, and apparatuses that support adaptive self-interference mitigation resources for full-duplex communication. For example, the described techniques enable a wireless device (e.g., a user equipment (UE), a network entity) to obtain resources that are dedicated to self-interference measurements, where one or more other devices may refrain from communicating (e.g., mute or cancel communications) for a duration while the wireless device performs the self-interference measurements using the dedicated resources. In one example, a UE may transmit a request for a set of resources for a self-interference mitigation procedure. In response, the UE may receive a configuration of the set of resources and may transmit one or more self-interference measurement signals via the configured set of resources. In such cases, the UE may perform the self-interference mitigation procedure in the absence of signals from one or more other devices. For example, upon receiving the request for the set of resources from the UE, a network entity may cancel one or more downlink transmissions, such as when the set of resources are activated for the self-interference mitigation procedure performed by the UE.

In another example, a network entity may configure a set of resources (e.g., periodic resources, semi-persistent resources) used for a self-interference mitigation procedure performed by the network entity. The network entity may transmit an indication of the set of resources to one or more other wireless devices (e.g., one or more UEs), which may cancel communications by the one or more other devices for a duration corresponding to the set of resources. In one example, a UE may receive an indication of a set of periodic resources for the self-interference mitigation procedure to be performed by the network entity, and the UE may cancel one or more uplink transmissions on resources that overlap with the set of periodic resources. In any case, performing the self-interference mitigation procedure via the dedicated set of resources may enable a wireless device to accurately and efficiently determine one or more self-interference cancelation coefficients, thereby enabling improved self-interference mitigation and cancelation by the device.

A method is described. The method may include transmitting a first message indicating a request for a set of time frequency resources for performing a self-interference mitigation procedure, receiving, in response to the first message, a second message indicating a configuration of the set of time-frequency resources based on the request, and transmitting a self-interference measurement (SIM) signal via the set of time-frequency resources based on the configuration.

An apparatus is described. The apparatus may include a processor, memory coupled with the processor, and instructions stored in the memory. The instructions may be executable by the processor to cause the apparatus to transmit a first message indicating a request for a set of time frequency resources for performing a self-interference mitigation procedure, receive, in response to the first message, a second message indicating a configuration of the set of time-frequency resources based on the request, and transmit a SIM signal via the set of time-frequency resources based on the configuration.

Another apparatus is described. The apparatus may include means for transmitting a first message indicating a request for a set of time frequency resources for performing a self-interference mitigation procedure, means for receiving, in response to the first message, a second message indicating a configuration of the set of time-frequency resources based on the request, and means for transmitting a SIM signal via the set of time-frequency resources based on the configuration.

A non-transitory computer-readable medium storing code is described. The code may include instructions executable by a processor to transmit a first message indicating a request for a set of time frequency resources for performing a self-interference mitigation procedure, receive, in response to the first message, a second message indicating a configuration of the set of time-frequency resources based on the request, and transmit a SIM signal via the set of time-frequency resources based on the configuration.

In some examples of the method, apparatuses, and non-transitory computer-readable medium described herein, transmitting the SIM signal may include operations, features, means, or instructions for transmitting the SIM signal in accordance with a type of resources included in the set of time-frequency resources, the type of resources including periodic resources, semi-persistent resources, dynamic resources, or any combination thereof, and where the configuration indicates the type of resources.

In some examples of the method, apparatuses, and non-transitory computer-readable medium described herein, the type of resources includes the semi-persistent resources and the method, apparatuses, and non-transitory computer-readable medium may include further operations, features, means, or instructions for receiving a first control message activating the set of time-frequency resources, where the SIM signal may be transmitted based on the first control message activating the set of time-frequency resources.

Some examples of the method, apparatuses, and non-transitory computer-readable medium described herein may further include operations, features, means, or instructions for starting a timer in response to receiving the first control message activating the set of time-frequency resources and deactivating the set of time-frequency resources based on an expiration of the timer.

Some examples of the method, apparatuses, and non-transitory computer-readable medium described herein may further include operations, features, means, or instructions for receiving a second control message deactivating the set of time-frequency resources.

In some examples of the method, apparatuses, and non-transitory computer-readable medium described herein, the type of resources includes the dynamic resources and the method, apparatuses, and non-transitory computer-readable medium may include further operations, features, means, or instructions for transmitting a request for the set of time-frequency resources based on a state of the user equipment (UE) being modified from a first state to a second state that may be different from the first state and receiving, in response to the request, downlink control information (DCI) including a resource grant for the set of time-frequency resources, where the SIM signal may be transmitted in response to the resource grant.

In some examples of the method, apparatuses, and non-transitory computer-readable medium described herein, transmitting the SIM signal may include operations, features, means, or instructions for transmitting the SIM signal based on one or more resource indices corresponding to respective time-frequency resources of the set of time-frequency resources, where the configuration indicates the one or more resource indices.

Some examples of the method, apparatuses, and non-transitory computer-readable medium described herein may further include operations, features, means, or instructions for determining one or more configurations of the set of time-frequency resources that may be supported by the UE for performing the self-interference mitigation procedure, where the first message indicates the one or more configurations.

Some examples of the method, apparatuses, and non-transitory computer-readable medium described herein may further include operations, features, means, or instructions for performing the self-interference mitigation procedure using one or more component carriers associated with a frequency region, the frequency region including one or more uplink frequency regions of a bandwidth, one or more downlink frequency regions of the bandwidth, or both, where the configuration indicates the frequency region.

In some examples of the method, apparatuses, and non-transitory computer-readable medium described herein, the SIM signal may be transmitted via a first component carrier of the one or more component carriers and the method, apparatuses, and non-transitory computer-readable medium may include further operations, features, means, or instructions for performing measurements of the SIM signal via a second component carrier of the one or more component carriers based on the configuration.

Some examples of the method, apparatuses, and non-transitory computer-readable medium described herein may further include operations, features, means, or instructions for identifying a waveform and a transmit power for transmitting the SIM signal based on the configuration, where the SIM signal includes the waveform and may be transmitted using the transmit power.

Some examples of the method, apparatuses, and non-transitory computer-readable medium described herein may further include operations, features, means, or instructions for selecting a waveform for the SIM signal based on the configuration excluding an indication of the waveform, where the SIM signal includes the waveform.

Some examples of the method, apparatuses, and non-transitory computer-readable medium described herein may further include operations, features, means, or instructions for receiving a first control message activating the set of time-frequency resources in response to a first event trigger, where the SIM signal may be transmitted based on the first event trigger.

Some examples of the method, apparatuses, and non-transitory computer-readable medium described herein may further include operations, features, means, or instructions for receiving a second control message deactivating the set of time-frequency resources in response to a second event trigger.

In some examples of the method, apparatuses, and non-transitory computer-readable medium described herein, the first event trigger includes one or beam pairs activated at the UE, a link quality measurement, or any combination thereof.

In some examples of the method, apparatuses, and non-transitory computer-readable medium described herein, transmitting the SIM signal may include operations, features, means, or instructions for transmitting the SIM signal in accordance with one or more time regions, a quantity of symbols, a periodicity, an offset value, or any combination thereof, where the configuration indicates the one or more time regions, the quantity of symbols, the periodicity, the offset value, or any combination thereof.

Some examples of the method, apparatuses, and non-transitory computer-readable medium described herein may further include operations, features, means, or instructions for identifying an uplink beam and a downlink beam associated with the set of time-frequency resources based on the configuration, the configuration indicating an uplink transmission configuration indicator (TCI) state, an uplink spatial relation, a downlink TCI state, or any combination thereof, where the self-interference mitigation procedure may be performed using the uplink beam and the downlink beam.

In some examples of the method, apparatuses, and non-transitory computer-readable medium described herein, the first message includes a UE capability report, UE assistance information, a media access control (MAC) control element, uplink control information, or any combination thereof.

A method is described. The method may include receiving, from a network entity, a message indicating a configuration of a set of time-frequency resources for a self-interference mitigation procedure, the set of time-frequency resources including periodic resources or semi-persistent resources, or both and canceling one or more uplink transmissions from the UE based on the configuration, where time-frequency resources associated with the one or more uplink transmissions at least partially overlap with the set of time-frequency resources.

An apparatus is described. The apparatus may include a processor, memory coupled with the processor, and instructions stored in the memory. The instructions may be executable by the processor to cause the apparatus to receive, from a network entity, a message indicating a configuration of a set of time-frequency resources for a self-interference mitigation procedure, the set of time-frequency resources including periodic resources or semi-persistent resources, or both and cancel one or more uplink transmissions from the UE based on the configuration, where time-frequency resources associated with the one or more uplink transmissions at least partially overlap with the set of time-frequency resources.

Another apparatus is described. The apparatus may include means for receiving, from a network entity, a message indicating a configuration of a set of time-frequency resources for a self-interference mitigation procedure, the set of time-frequency resources including periodic resources or semi-persistent resources, or both and means for canceling one or more uplink transmissions from the UE based on the configuration, where time-frequency resources associated with the one or more uplink transmissions at least partially overlap with the set of time-frequency resources.

A non-transitory computer-readable medium storing code is described. The code may include instructions executable by a processor to receive, from a network entity, a message indicating a configuration of a set of time-frequency resources for a self-interference mitigation procedure, the set of time-frequency resources including periodic resources or semi-persistent resources, or both and cancel one or more uplink transmissions from the UE based on the configuration, where time-frequency resources associated with the one or more uplink transmissions at least partially overlap with the set of time-frequency resources.

In some examples of the method, apparatuses, and non-transitory computer-readable medium described herein, the set of time-frequency resources includes the semi-persistent resources and the method, apparatuses, and non-transitory computer-readable medium may include further operations, features, means, or instructions for receiving a first control message activating the set of time-frequency resources, where the one or more uplink transmissions may be canceled in response to receiving the first control message activating the set of time-frequency resources.

Some examples of the method, apparatuses, and non-transitory computer-readable medium described herein may further include operations, features, means, or instructions for starting a timer in response to receiving the first control message activating the set of time-frequency resources and transmitting one or more additional uplink transmissions based on an expiration of the timer.

Some examples of the method, apparatuses, and non-transitory computer-readable medium described herein may further include operations, features, means, or instructions for receiving a second control message deactivating the set of time-frequency resources and transmitting one or more additional uplink transmissions in response to receiving the second control message deactivating the set of time-frequency resources.

Some examples of the method, apparatuses, and non-transitory computer-readable medium described herein may further include operations, features, means, or instructions for determining that the set of time-frequency resources may be activated based on one or more events, where the one or more uplink transmissions may be canceled based on the set of time-frequency resources being activated.

In some examples of the method, apparatuses, and non-transitory computer-readable medium described herein, the one or more events include a beam change at the UE, an activation of one or more uplink beams, or both.

In some examples of the method, apparatuses, and non-transitory computer-readable medium described herein, canceling the one or more uplink transmissions may include operations, features, means, or instructions for canceling the one or more uplink transmissions based on a priority associated with each of the one or more uplink transmissions, the one or more uplink transmissions including a physical uplink shared channel transmission, a repetition of a physical uplink shared channel transmission, a physical uplink control channel, or any combination thereof.

In some examples of the method, apparatuses, and non-transitory computer-readable medium described herein, canceling the one or more uplink transmissions may include operations, features, means, or instructions for canceling the one or more uplink transmissions based on a transmission type of the one or more uplink transmissions.

In some examples of the method, apparatuses, and non-transitory computer-readable medium described herein, the transmission type includes a semi-persistently scheduled physical uplink shared channel transmission, a dynamically-granted physical uplink shared channel transmission, a periodic sounding reference signal transmission, a semi-persistent sounding reference signal transmission, or any combination thereof.

In some examples of the method, apparatuses, and non-transitory computer-readable medium described herein, canceling the one or more uplink transmissions may include operations, features, means, or instructions for canceling the one or more uplink transmissions based on an application of the one or more uplink transmissions, the application including a codebook-based sounding reference signal or a non-codebook-based sounding reference signal, or both.

In some examples of the method, apparatuses, and non-transitory computer-readable medium described herein, canceling the one or more uplink transmissions may include operations, features, means, or instructions for canceling the one or more uplink transmissions based on a type of information included in each of the one or more uplink transmissions, the type of information including a scheduling request, hybrid automatic repeat request feedback, periodic channel state information, semi-persistent channel state information, or any combination thereof.

In some examples of the method, apparatuses, and non-transitory computer-readable medium described herein, canceling the one or more uplink transmissions may include operations, features, means, or instructions for canceling at least a portion of the one or more uplink transmissions based on the time-frequency resources at least partially overlapping with the set of time-frequency resources.

In some examples of the method, apparatuses, and non-transitory computer-readable medium described herein, canceling the one or more uplink transmissions may include operations, features, means, or instructions for performing rate matching around the set of time-frequency resources based on the configuration.

In some examples of the method, apparatuses, and non-transitory computer-readable medium described herein, the configuration of the set of time-frequency resources includes an indication of one or more resource indices corresponding to respective time-frequency resources of the set of time-frequency resources, a type of resources included in the set of time-frequency resources, one or more time regions, one or more frequency regions, a periodicity, an offset value, one or more uplink beams associated with the set of time-frequency resources, or any combination thereof.

A method is described. The method may include receiving a first message indicating a request for a set of time frequency resources for a self-interference mitigation procedure at a UE, transmitting, in response to the first message, a second message indicating a configuration of the set of time-frequency resources based on the request, and canceling one or more downlink transmissions based on the configuration, where time-frequency resources associated with the one or more downlink transmissions at least partially overlap with the set of time-frequency resources.

An apparatus is described. The apparatus may include a processor, memory coupled with the processor, and instructions stored in the memory. The instructions may be executable by the processor to cause the apparatus to receive a first message indicating a request for a set of time frequency resources for a self-interference mitigation procedure at a UE, transmit, in response to the first message, a second message indicating a configuration of the set of time-frequency resources based on the request, and cancel one or more downlink transmissions based on the configuration, where time-frequency resources associated with the one or more downlink transmissions at least partially overlap with the set of time-frequency resources.

Another apparatus is described. The apparatus may include means for receiving a first message indicating a request for a set of time frequency resources for a self-interference mitigation procedure at a UE, means for transmitting, in response to the first message, a second message indicating a configuration of the set of time-frequency resources based on the request, and means for canceling one or more downlink transmissions based on the configuration, where time-frequency resources associated with the one or more downlink transmissions at least partially overlap with the set of time-frequency resources.

A non-transitory computer-readable medium storing code is described. The code may include instructions executable by a processor to receive a first message indicating a request for a set of time frequency resources for a self-interference mitigation procedure at a UE, transmit, in response to the first message, a second message indicating a configuration of the set of time-frequency resources based on the request, and cancel one or more downlink transmissions based on the configuration, where time-frequency resources associated with the one or more downlink transmissions at least partially overlap with the set of time-frequency resources.

In some examples of the method, apparatuses, and non-transitory computer-readable medium described herein, transmitting the second message may include operations, features, means, or instructions for transmitting the second message including an indication of a type of resources included in the set of time-frequency resources, the type of resources including periodic resources, semi-persistent resources, dynamic resources, or any combination thereof.

In some examples of the method, apparatuses, and non-transitory computer-readable medium described herein, the type of resources includes the semi-persistent resources and the method, apparatuses, and non-transitory computer-readable medium may include further operations, features, means, or instructions for transmitting a first control message activating the set of time-frequency resources, where the one or more downlink transmissions may be canceled based on the first control message activating the set of time-frequency resources.

Some examples of the method, apparatuses, and non-transitory computer-readable medium described herein may further include operations, features, means, or instructions for transmitting a second control message deactivating the set of time-frequency resources.

In some examples of the method, apparatuses, and non-transitory computer-readable medium described herein, the first control message activating the set of time-frequency resources may be transmitted in response to a first event trigger, the first event trigger including one or beam pairs activated at the UE, a link quality measurement, or any combination thereof.

Some examples of the method, apparatuses, and non-transitory computer-readable medium described herein may further include operations, features, means, or instructions for transmitting a second control message deactivating the set of time-frequency resources in response to a second event trigger.

In some examples of the method, apparatuses, and non-transitory computer-readable medium described herein, the type of resources includes the dynamic resources and the method, apparatuses, and non-transitory computer-readable medium may include further operations, features, means, or instructions for receiving a request for the set of time-frequency resources based on a state of the UE being modified from a first state to a second state that may be different from the first state and transmitting, in response to the request, DCI including a resource grant for the set of time-frequency resources, where the one or more downlink transmissions may be canceled based on the resource grant.

A method is described. The method may include transmitting a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration and transmitting a SIM signal via the set of time-frequency resources.

An apparatus is described. The apparatus may include a processor, memory coupled with the processor, and instructions stored in the memory. The instructions may be executable by the processor to cause the apparatus to transmit a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration and transmit a SIM signal via the set of time-frequency resources.

Another apparatus is described. The apparatus may include means for transmitting a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration and means for transmitting a SIM signal via the set of time-frequency resources.

A non-transitory computer-readable medium storing code is described. The code may include instructions executable by a processor to transmit a message indicating a configuration of a set of time-frequency resources for performing a self-interference mitigation procedure, the set of time-frequency resources including periodic resources or semi-persistent resources, or both, where at least a portion of uplink transmissions from one or more UEs that overlap with the set of time-frequency resources are canceled based on the configuration and transmit a SIM signal via the set of time-frequency resources.

In some examples of the method, apparatuses, and non-transitory computer-readable medium described herein, the set of time-frequency resources includes the semi-persistent resources and the method, apparatuses, and non-transitory computer-readable medium may include further operations, features, means, or instructions for transmitting a first control message activating the set of time-frequency resources, where the SIM signal may be transmitted in response to transmitting the first control message activating the set of time-frequency resources.

Some examples of the method, apparatuses, and non-transitory computer-readable medium described herein may further include operations, features, means, or instructions for starting a timer in response to transmitting the first control message activating the set of time-frequency resources and deactivating the set of time-frequency resources based on an expiration of the timer.

Some examples of the method, apparatuses, and non-transitory computer-readable medium described herein may further include operations, features, means, or instructions for transmitting a second control message deactivating the set of time-frequency resources.

Some examples of the method, apparatuses, and non-transitory computer-readable medium described herein may further include operations, features, means, or instructions for activating the set of time-frequency resources based on one or more events, where the SIM signal may be transmitted based on the set of time-frequency resources being activated, the one or more events including a beam change at the UE, an activation of one or more uplink beams, or both.

In some examples of the method, apparatuses, and non-transitory computer-readable medium described herein, the configuration of the set of time-frequency resources includes an indication of one or more resource indices corresponding to respective time-frequency resources of the set of time-frequency resources, a type of resources included in the set of time-frequency resources, one or more time regions, one or more frequency regions, a periodicity, an offset value, one or more uplink beams associated with the set of time-frequency resources, or any combination thereof.

BRIEF DESCRIPTION OF THE DRAWINGS

FIGS. 2A and 2B illustrate examples of wireless communications systems that support adaptive self-interference mitigation resources for full-duplex communication in accordance with one or more aspects of the present disclosure.

FIGS. 14 through 20 show flowcharts illustrating methods that support adaptive self-interference mitigation resources for full-duplex communication in accordance with one or more aspects of the present disclosure.

DETAILED DESCRIPTION

Figure 1:
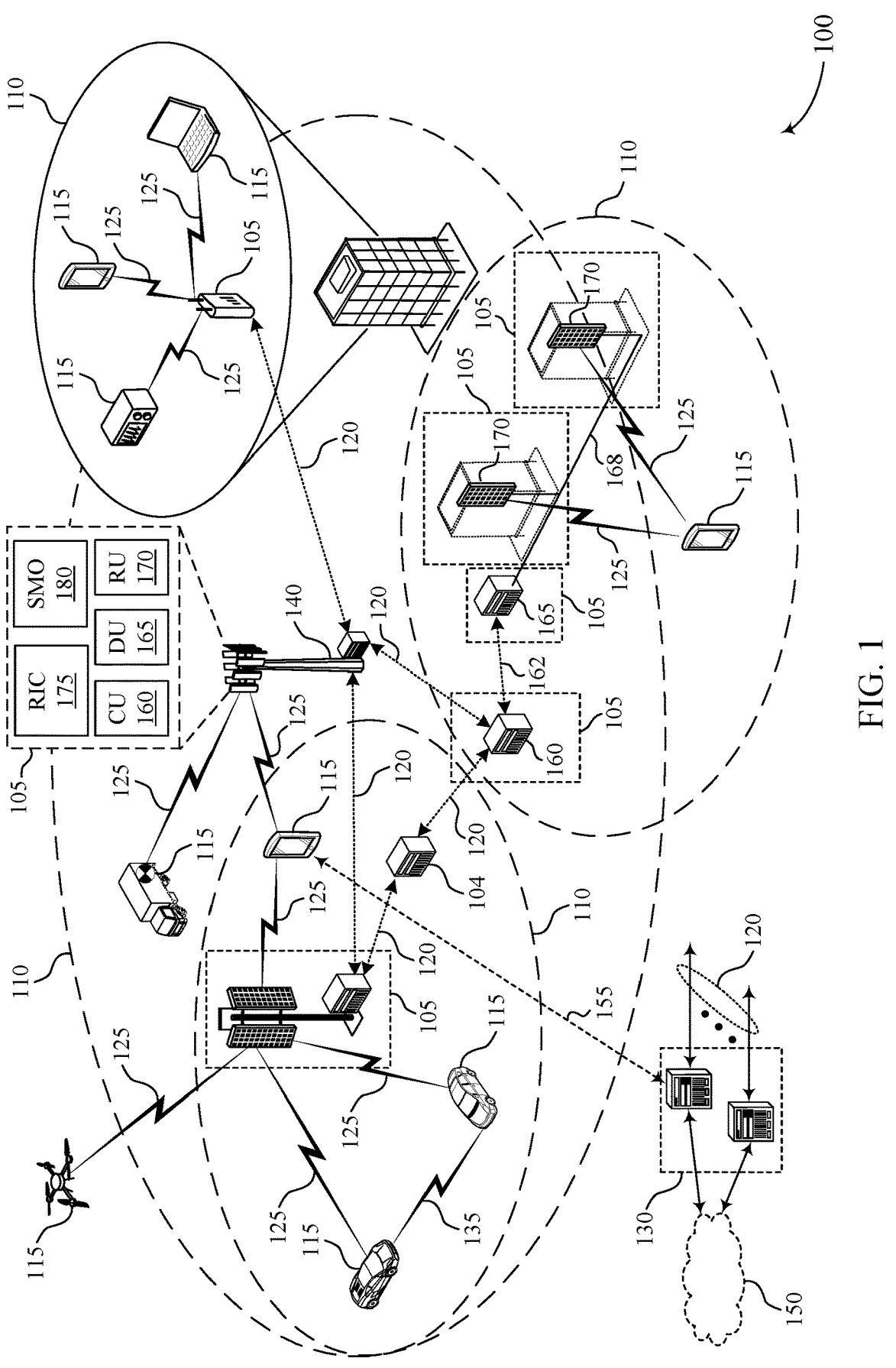
FIG. 1 illustrates an example of a wireless communications system that supports adaptive self-interference mitigation resources for full-duplex communication in accordance with one or more aspects of the present disclosure.

In some cases, one or more devices communicating in a wireless communications system may operate according to a full-duplex mode (e.g., operable to simultaneously receive communications and transmit communications). That is, a full-duplex device (e.g., a user equipment (UE), a network entity) may transmit signaling via a first set of frequency resources allocated for a first communications link (uplink communications, downlink communications, sidelink communications, etc.), and may concurrently (e.g., within a same slot or transmission time interval (TTI)) receive signaling via a second set of frequency resources allocated for a second communications link. In some such configurations, however, the device may experience interference (e.g., self-interference) due to transmitting a signal on the first set of frequency resources and receiving the same signal on the second set of frequency resources. For example, a network entity may be affected by self-interference when transmitting a first message via downlink frequency resources and receiving both a second message (e.g., a desired message) and the first message via uplink frequency resources, which may reduce the likelihood of successfully decoding the second message at the network entity.

In some cases, a device (e.g., a full-duplex device experiencing self-interference) may perform a self-interference cancelation (SIC) procedure to mitigate interference incurred by receiving (e.g., via resources allocated for reception) a transmission from the same device (e.g., via resources allocated for transmission), for example, using full-duplex communications. For example, the device (e.g., a UE or a network entity) may, as part of an SIC procedure, tune one or more SIC coefficients (e.g., transmit power, receive gain, resource allocation, a beam used, and the like) by transmitting a self-interference measurement (SIM) signal via a first beam (e.g., a transmit beam), receiving the SIM signal via a second beam (e.g., a receive beam), and measuring the SIM signal. However, the device may perform the SIC procedure when one or more different devices are transmitting signals, which may impact (e.g., reduce) the effectiveness of SIC coefficient adaptation (e.g., due to receiving signaling interfering with the SIM signal).

To support self-interference mitigation procedures (e.g., SIC procedures) for SIC coefficient adaption, a device may identify a set of time-frequency resources dedicated to performing an SIC procedure (e.g., resources independent of ongoing communications between other devices). In some examples, such as mitigating self-interference at a UE, the UE may transmit a request (e.g., to a network entity or to another UE) indicating one or more time-frequency resources for performing an SIC procedure. For example, the UE may request a set of resources (e.g., via a capability report, assistance information, a media access control (MAC) control element (MAC-CE), uplink control information (UCI) signaling, or any combination thereof), and may receive a configuration of the set resources from a network entity. In some cases, the network entity may refrain from performing communications (e.g., cancel one or more downlink transmissions) at resources configured for the SIC procedure at the UE. That is, the UE may transmit (e.g., via a transmit beam) an SIM signal via the configured resources and may measure (e.g., via a receive beam) the SIM signal with greater reliability (e.g., without interference from ongoing signaling).

In some other cases, such as mitigating self-interference at a network entity, the network entity may configure a set of time-frequency resources to perform an SIC procedure. In some cases, the network entity may transmit a message (e.g., to one or more UEs) indicating the configuration (e.g., periodic resources, semi-persistent resources, or aperiodic resources). That is, one or more uplink transmissions may be canceled (e.g., full cancelation or partial cancelation) in accordance with the configuration, which may facilitate effective SIC coefficient adaptation at the network entity. For example, the network entity may utilize the set of time-frequency resources to transmit an SIM signal (e.g., via frequency resources allocated for downlink communications) and may receive the same signal (e.g., via frequency resources allocated for uplink communications) to train one or more SIC coefficients.

Aspects of the disclosure are initially described in the context of wireless communications systems. Aspects of the disclosure are further illustrated by process flows that relate to adaptive self-interference mitigation resources for full-duplex communication. Aspects of the disclosure are further illustrated by and described with reference to apparatus diagrams, system diagrams, and flowcharts that relate to adaptive self-interference mitigation resources for full-duplex communication.

FIG. 1 illustrates an example of a wireless communications system 100 that supports adaptive self-interference mitigation resources for full-duplex communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support adaptive self-interference mitigation resources for full-duplex communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time.

For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by)

the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, a wireless device (e.g., a network entity 105, a UE 115) may communicate in a full-duplex mode. For example, the device may transmit and receive signals simultaneously (e.g., within a same slot or TTI). In some cases, however, the device may experience self-interference, such as a direct coupling interference between a transmission antenna array and a reception antenna array. In some other cases, the device may receive its own transmitted signal (e.g., via a directional beam), which may be reflected back to the device from one or more objects, thereby causing interference with a desired signal (e.g., received by the device). To support self-interference mitigation and cancelation, the device may perform a SIC procedure (e.g., a self-interference mitigation procedure), which may include adapting one or more SIC coefficients (e.g., transmit power, receive gain, frequency resource allocation, active beams, or the like). In some cases, the device may perform the SIC procedure in the presence of ongoing signaling between other devices of the wireless communications system 100, which may impact the effectiveness of SIC coefficient adaptation. As an example, a UE 115 may attempt to transmit a self-interference measurement signal when a network entity 105 is transmitting one or more downlink messages. Similarly, a network entity 105 may attempt to perform a self-interference mitigation procedure while receiving uplink signals from various UEs 115 in the wireless communications system 100.

As a result, the wireless communications system 100 may support the use of time-frequency resources that are dedicated to self-interference mitigation procedures and, during which, one or more other devices refrain from communicating, so as to improve SIC coefficient adaptation and enhance a device's ability to mitigate self-interference. For example, the wireless communications system 100 may support techniques that enable a wireless device (e.g., a UE 115, a network entity 105) to obtain resources that are dedicated to self-interference measurements, where one or more other devices may mute or cancel communications for a duration while the wireless device performs the self-interference measurements using the dedicated resources.

In one example, a UE 115 may transmit a request for a set of resources for a self-interference mitigation procedure. In response, the UE 115 may receive a configuration of the set of resources and may transmit one or more self-interference measurement signals via the configured set of resources. In such cases, the UE 115 may perform the self-interference mitigation procedure in the absence of signals from one or more other devices. For example, upon receiving the request for the set of resources from the UE 115, a network entity 105 may cancel one or more downlink transmissions, such as when the set of resources are activated for the self-interference mitigation procedure performed by the UE 115. In some aspects, the configured set of resources may be initially configured (e.g., in response to the request) and then later activated by additional signaling (e.g., from the network entity) or based on one or more event triggers, such as a state change of the UE 115, beams used by the UE 115, a link quality experienced by the UE 115 or the network entity 105, or the like.

In another example, a network entity 105 may configure a set of resources (e.g., periodic resources, semi-persistent resources) used for a self-interference mitigation procedure performed by the network entity 105. The network entity 105 may transmit an indication of the set of resources to one or more other wireless devices (e.g., one or more UEs 115), which may cancel communications by the one or more other devices for a duration corresponding to the set of resources. In one example, a UE 115 may receive an indication of a set of periodic resources for the self-interference mitigation procedure to be performed by the network entity 105, and the UE 115 may cancel one or more uplink transmissions on resources that overlap with the set of periodic resources. In some cases, the cancelation of uplink transmissions may be based on a priority of one or more uplink transmissions, a type of the one or more uplink transmissions, information included in the one or more transmissions, or the like. In any case, performing the self-interference mitigation procedure via the dedicated set of resources may enable a wireless device to accurately and efficiently determine one or more self-interference cancelation coefficients, thereby enabling improved self-interference mitigation and cancelation by the device.

FIGS. 2A and 2B illustrate examples of wireless communications systems 201 and 202, respectively, that support adaptive self-interference mitigation resources for full-duplex communication in accordance with various aspects of the present disclosure. In some cases, the wireless communications systems 201 and 202 may implement aspects of the wireless communications system 100. For example, the wireless communications systems 201 and 202 may include a UE 115-a, a UE 115-b, and a network entity 105-a, which may be respective examples of UEs 115 and a network entity 105-a as described with reference to FIG. 1. In some examples, a full-duplex device (e.g., the UE 115-a or the network entity 105-a) may experience self-interference due direct coupling interference (e.g., between a transmission antenna array and a reception antenna array at the full-duplex device), due to receiving both a desired signal (e.g., from a device 205 or the UE 115-b) and a signal transmitted by the full-duplex device, or both. In some cases, devices of the wireless communications systems 201 and 202 may perform communications (e.g., transmitting and receiving signals) via a first transmit beam 245 (e.g., from the full-duplex device), a second transmit beam 245 (e.g., from a device communicating from the full-duplex device), and a receive beam 250 (e.g., used by the full-duplex device).

FIG. 2A illustrates an example of a wireless communications system 201, in which a UE 115 (e.g., the UE 115-a) may be operable to concurrently receive and transmit wireless signals (e.g., a full-duplex UE 115). For example, the full-duplex UE 115-a may transmit a first message via a transmit beam 240, and may receive a second message, via a receive beam 250, from a device 205 within a same time-domain resource (e.g., a slot, a TTI, or the like). Additionally, the full-duplex UE 115-a may transmit and receive signaling via a similar bandwidth (e.g., a same frequency or an overlapping frequency) in a single-frequency full-duplex (SFFD) mode, or may transmit and receive signaling via a bandwidth partitioned between respective operations (e.g., a first frequency allocated for uplink communications and a second frequency allocated for downlink communications) in a sub-band full-duplex (SBFD) mode. In some cases, the device 205 may be an example of a network entity 105, such as when the UE 115-a and the device 205 communicate via a Uu interface (e.g., uplink and downlink communications). Additionally, or alternatively, the device 205 may be an example of a second UE 115, such as when the UE 115-a and the device 205 communicate via a sidelink interface (e.g., performing communications independently from a network entity 105).

In some examples, the UE 115-a may experience self-interference (e.g., direct coupling interference, over-the-air interference, or both) due to operating according to a full-duplex configuration. For example, the UE 115-a may include a first antenna array for transmitting beamformed signals and a second antenna array for receiving beam-formed signals. The UE 115-a may incur self-interference due to concurrently operating the first antenna array and the second antenna array, such as mutual coupling (e.g., direct interference from the transmission chain to the reception chain through an internal coupling path). Additionally, or alternatively, the UE 115-a may transmit the message via the transmit beam 240, and may receive the message (e.g., unexpectedly) via the receive beam 250. For example, the UE 115-a may transmit the message in a first direction, which may collide with clutter 210 (e.g., a physical structure). That is, the clutter 210 may redirect the spatial signal in a second direction, which may result in receiving the message via the receive beam 250. In some examples, receiving the message may incur interference with receiving a desired message (e.g., from the device 205).

To mitigate self-interference, the UE 115-a may perform an SIC procedure, which may suppress self-interference for subsequent full-duplex communications. In some aspects, a SIC procedure may be referred to as a self-interference mitigation procedure. In some cases, as part of the SIC procedure, the UE 115-a may estimate the self-interference by transmitting a SIM signal via the transmit beam 240, and receiving the SIM signal via the receive beam 250. The UE 115-a may then tune one or more SIC coefficients based on the measured SIM signal, which may support greater accuracy of self-interference estimation and cancelation. For example, the UE 115-a may adapt the SIC coefficients according to changes of an environment (e.g., transmit power, receive gain, frequency resource allocation, active beams, or the like), or may adapt the SIC coefficients according one or more adaptation algorithms (e.g., least squares, recursive least squares, machine learning (ML)-based algorithms, or the like). In some examples, the SIC procedure may include a non-linear SIC procedure, where the UE 115-a may perform one or more procedures (e.g., polynomial kernel selection, coefficient training, interference reconstruction) when generating and/or adapting the SIC coefficients.

In some cases, the UE 115-a may receive a desired signal during an SIC procedure, which may interfere with the UE 115-a tuning the SIC coefficients. For example, the UE 115-a may receive both a jammer signal (e.g., the SIM signal) and the desired signal via the receive beam 250. In some examples, the UE 115-a may identify a ratio between the signal strength (e.g., an SNR) of the jammer signal and the desired signal, and may determine to suppress the desired signal based on the ratio. That is, for a relatively large difference in the signal strengths (e.g., a relatively high jammer-to-desired ratio), the UE 115-a may ignore the impact of the desired signal. However, for a relatively small difference in the signal strengths (e.g., a relatively low jammer-to-desired ratio), the UE 115-a may determine to suppress the desired signal.

To reduce interference from a desired signal while tuning SIC coefficients, the UE 115-a may perform the SIC coefficient adaptation during one or more time-domain resources (e.g., symbols, slots, TTIs) where transmissions (e.g., downlink transmissions from a network entity 105) are not scheduled. However, the UE 115-a may be unable to accurately predict or identify resources which are not used to receive scheduled transmissions. Additionally, or alternatively, the UE 115-a may successfully identify one or more resources without scheduled transmissions, but may receive signals transmitted to other geographically nearby UEs 115, which may interfere with the SIC coefficient adaptation.

Figure 3A:
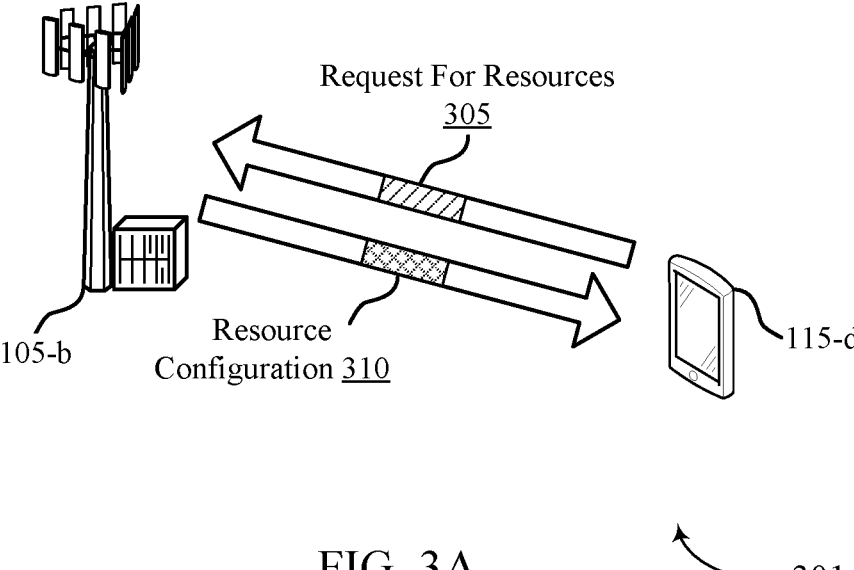
FIGS. 3A and 3B illustrate examples of wireless communications systems that support adaptive self-interference mitigation resources for full-duplex communication in accordance with one or more aspects of the present disclosure.

Thus, as described herein, the UE 115-a may request a set of time-frequency resources to use for tuning SIC coefficients (as described further with reference to FIG. 3A). For example, the UE 115-a may transmit a request for a set of resources for a self-interference mitigation procedure. In response, the UE 115-a may receive a configuration of the set of resources and may transmit one or more self-interference measurement signals via the configured set of resources. In such cases, the UE 115-a may perform the self-interference mitigation procedure in the absence of signals from one or more other devices. For example, upon receiving the request for the set of resources from the UE 115-a, a network entity may cancel one or more downlink transmissions, such as when the set of resources are activated for the self-interference mitigation procedure performed by the UE 115-a. Such techniques may improve SIC procedures performed by the UE 115-a due to an absence of signaling from one or more other devices (e.g., the device 205) when the UE 115-a is transmitting and measuring self-interference measurement signals.

FIG. 2B illustrates an example of a wireless communications system 201, in which a full-duplex network entity 105-a may experience self-interference. That is, the network entity 105-a may transmit a message via a transmit beam 240, which may be redirected (e.g., due to colliding with clutter 225) towards the network entity 105-a, thereby interfering with receiving, via a receive beam 250, a signal from a UE 115-b. Additionally, or alternatively, the network entity 105-a may experience direct coupling interference due to mutual coupling between a transmission antenna array and a reception antenna array. In some cases, the full-duplex network entity 105-a may, after recognizing the self-interference, estimate self-interference, may tune one or more SIC coefficients as part of an SIC procedure, and may determine to suppress a desired signal using processes similar to that of the UE 115-a, as described with reference to FIG. 2A.

To support performing the SIC coefficient adaptation via resources free from scheduled transmissions, the network entity 105-a may identify one or more resources for tuning SIC coefficients, and may refrain from scheduling transmissions (e.g., uplink transmissions from one or more UEs 115) during the one or more resources. In some examples, the network entity 105-a may successfully prevent scheduled transmissions during the one or more resources, but may be unable to dynamically cancel periodic uplink transmissions (e.g., previously established periodic transmissions). That is, the network entity may avoid using resources scheduled for periodic uplink transmissions (e.g., periodic sounding reference signals (SRSs), CSI reporting, or periodic scheduling requests (SRs)). However, as a quantity of UEs 115 which the network entity 105-a serves increases, a quantity of resources available for SIC coefficient adaptation (e.g., resources free from scheduled transmissions) may be limited.

Figure 3B:
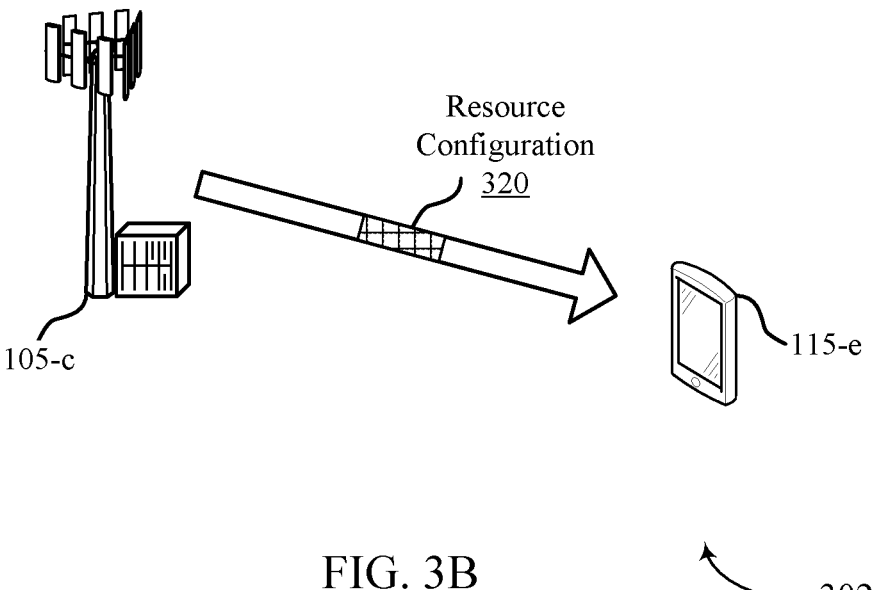

Thus, as described herein, the network entity 105-a may configure a set of one or more time-frequency resources for performing SIC coefficient adaptation, and may indicate the set of resources to one or more UEs 115 (as described further with reference to FIG. 3B). The network entity 105-a may configure a set of resources (e.g., periodic resources, semi-persistent resources) used for a self-interference mitigation procedure performed by the network entity 105-a. The network entity 105-a may transmit an indication of the set of resources to one or more other wireless devices (e.g., one or more UEs 115, such as UE 115-b), which may cancel communications by the one or more other devices for a duration corresponding to the set of resources. In one example, the UE 115-b may receive an indication of a set of periodic resources for the self-interference mitigation procedure to be performed by the network entity 105-a, and the UE 115-b may cancel one or more uplink transmissions on resources that overlap with the set of periodic resources. Such techniques may improve SIC procedures performed by the network entity 105-a due to an absence of signaling from one or more UEs when the network entity 105-a is transmitting and measuring self-interference measurement signals.

FIGS. 3A and 3B illustrate examples of wireless communications systems 301 and 302, respectively, that support adaptive self-interference mitigation resources for full-duplex communication in accordance with one or more aspects of the present disclosure. The wireless communications systems 301 and 302 may implement aspects of the wireless communications systems 100, 201, and 202, as described with reference to FIGS. 1, 2A, and 2B, respectively. For example, the wireless communications systems 301 and 302 may include a network entity 105-b, a network entity 105-c, a UE 115-d, and a UE 115-e, which may be examples of network entities 105 and UEs 115, respectively, as described with reference to FIG. 1. Further, the wireless communications systems 301 and 302 may include a full-duplex wireless device (e.g., the UE 115-d and the network entity 105-c), which may be operable to identify a set of time-frequency resources for adapting one or more SIC coefficients as part of an SIC procedure.

FIG. 3A illustrates a wireless communications system 301, in which a full-duplex UE 115-d may request a set of time-frequency resources for performing an SIC procedure. In some examples, the full-duplex UE 115-d may determine to request the set of resources based on processes similar to that of the full-duplex UE 115-a (e.g., identifying a relatively high jammer-to-signal ratio), as described with reference to FIG. 2A. The UE 115-d may transmit, to the network entity 105-b, a request for resources 305 (e.g., a first message), which may indicate the set of time-frequency resources for the UE 115-d to use for transmitting, receiving, and measuring an SIM signal. In some cases, the UE 115-a may indicate the request via a capability report for the UE 115-d, assistance information for the UE 115-d, a MAC-CE), UCI, or any combination thereof. Additionally, or alternatively, the UE 115-d may determine one or more configurations of the set of time-frequency resources that the UE 115-d is operable to use (e.g., supported configurations) or that the UE 115-d is operable to efficiently use (e.g., preferred configurations), and the UE 115-d may include the one or more configurations in the request for resources 305.

In some examples, the network entity 105-b may configure a set of time-frequency resources for the UE 115-d to use for SIC coefficient adaptation based on receiving the request for resources 305 from the UE 115-d. That is, the network entity 105-b may use the request for resources 305 to configure the set of time-frequency resources, and may transmit a resource configuration 310 to the UE 115-d. In some cases, the network entity 105-b may suppress signaling at resources of resource configuration 310 by refraining from scheduling subsequent transmissions, cancelling previously scheduled transmissions, rate-matching downlink transmissions, or any combination thereof. The UE 115-d may then utilize the resources indicated by the resource configuration 310 in order to mitigate self-interference (e.g., tune SIC coefficients as part of an SIC procedure).

In some examples, the request for resources 305, the resource configuration 310, or both, may include information relating to the set of time-frequency resources for the UE 115-d to perform self-interference adaptation. That is, the UE 115-d may indicate one or more parameters for the set of resources in the request for resources 305 for the network entity 105-b apply to the resource configuration 310, or the network entity 105-b may determine the one or more parameters for the set of resources independent of the request for resources 305. In some cases, the resource configuration 310 may indicate a type of the set of resources. For example, the network entity 105-b may configure the set of resources to be periodic resources, semi-persistent resources, dynamic resources (e.g., aperiodic resources), or any combination thereof, and may indicate the type of the resource in the resource configuration 310.

Additionally, or alternatively, the network entity 105-b may indicate a respective resource index for each resource of the set of resources in the resource configuration 310. In some examples, the resource configuration 310 may indicate a bandwidth corresponding to one or more transmission frequency regions (e.g., uplink frequencies), one or more reception frequency regions (e.g., downlink frequencies), or both, for the UE 115-d to use for transmitting and receiving an SIM signal (e.g., a cross-frequency SIM). In some such examples, the UE 115-d may communicate according to an intra-band carrier aggregation (CA) scheme, which may include one or more component carriers (CCs) allocated for different types of communications. For example, the UE 115-d may perform the SIC procedure by transmitting an SIM signal via a first CC associated with an uplink frequency, and may receive the SIM signal via a second CC associated with downlink communications. That is, the UE 115-d may use a common interference cancelation configuration (e.g., the resource configuration 310) for CCs sharing a same wideband frequency. In some cases, the resource configuration 310 may indicate timing information related to performing the SIC procedure at the UE 115-d. For example, the UE 115-d may tune the SIC coefficients over a duration in accordance with the timing information. The timing information may be a time region (e.g., a quantity of symbols), a periodicity of one or more slots, a slot offset value, or any combination thereof.

In some cases, the UE 115-d may transmit an SIM signal via one or more frequency resources (e.g., component carriers) allocated for transmissions (e.g., an uplink frequency region). The UE 115-d may identify a waveform (e.g., an SRS waveform), a transmission power value, or both, for the SIM signal, which may be included in resource configuration 310. Additionally, or alternatively, the UE 115-d may select a waveform for the SIM signal based on the resource configuration 310 excluding an indication of the waveform. In some examples, the resource configuration 310 may indicate one or more beams for the UE 115-d to use for transmitting and receiving the SIM signal. For example, the resource configuration 310 may include an indication of an uplink transmission configuration indicator (TCI) state, an uplink spatial relation, a downlink TCI state, or any combination thereof, which the UE 115-d may use to identify an uplink beam (e.g., a transmit beam) for transmitting the SIM signal, a downlink beam (e.g., a receive beam) for receiving and measuring the SIM signal, or both.

In some cases, the set of resources for the UE 115-d to perform an SIC procedure may be activated or deactivated based on a type of the set of resources indicated in the resource configuration 310. That is, the UE 115-d may perform the SIC procedure when the resources are in an activated state, and may refrain from performing the SIC procedure when the resources are in a deactivated state. In some examples, such as when the resource configuration 310 indicates the set of resources to be semi-persistent, the UE 115-d may receive a control message (e.g., downlink control information (DCI), MAC-CE signaling, or both) activating or deactivating the set of resources. That is, the UE 115-d may activate the set of resources in response to a first control message, and may deactivate the set of resources in response to a second control message. Additionally, or alternatively, the UE 115-d may initiate a timer (e.g., a validity timer) in response to receiving a control message activating the set of resources, and may deactivate the set of resources upon an expiration of the timer. In some other cases, such as when the resource configuration 310 indicates the set of resources to be dynamic (e.g., aperiodic), the UE 115-d may transmit a request for the set of resources upon a state of the UE 115-d changing (e.g., changing transmission beams, changing reception beams, changing an automatic gain control (AGC) gain state, or any combination thereof). The network entity 105-b may, in response to the request, transmit a DCI to the UE 115-d, which may include a grant for the set of resources that the UE 115-d may use for SIC coefficient adaptation.

In some examples, the set of resources for the UE 115-d to perform an SIC procedure may be activated or deactivated based on an event (e.g., event-triggered activation and deactivation). That is, the UE 115-d may receive a first control message activating the set of resources based on satisfying a first event trigger, and may receive a second control message deactivating the set of resources based on satisfying a second event trigger. In some examples, the event triggers may be satisfied by one or more active beam pairs (e.g., beams measured for self-interference) at the UE 115-d, a link quality between the network entity 105-b and the UE 115-d, or both. For example, the network entity 105-a may identify a quantity of active downlink beams, uplink beams, or both based on an indication of one or more TCI states (e.g., a downlink TCI state, an uplink TCI state, or a joint TCI state) at the UE 115-d, and may activate or deactivate the set of resources based on the one or more TCI states. In some such examples, the network entity may activate a respective resource configuration corresponding to each active downlink beam, uplink beam, or combination of beams.

Additionally, or alternatively, the set of resources may be activated or deactivated according to a link quality measurement, such as an SNR measurement and scheduling information for the set of resources (e.g., a modulation and coding scheme (MCS), a quantity of layers, a quantity of resource blocks, or any combination thereof). For instance, the UE 115-a may identify a relatively high MCS for the set of resources and may measure a relatively high SNR value, which may correspond to a relatively high jammer-to-signal ratio (e.g., a greater impact on the SIC coefficient training). Accordingly, the network entity 105-b may activate a relatively larger quantity, higher density, or both of resources in the set of resources. In some cases, each resource of the set of resources may correspond to a respective portion of the scheduling information.

FIG. 3B illustrates a wireless communications system 302, in which a full-duplex network entity 105-c may configure a set of time-frequency resources for performing an SIC procedure. In some examples, the full-duplex network entity 105-c may determine to configure the set of resources based on processes similar to that of the full-duplex network entity 105-a (e.g., identifying a relatively high jammer-to-signal ratio), as described with reference to FIG. 2B. The network entity 105-c may utilize the set of resources for mitigating self-interference as part of an SIC procedure, which may involve tuning one or more SIC coefficients. In some examples, the network entity 105-c may suppress signaling occurring at the one or more resources by transmitting a resource configuration 320 to one or more UEs 115 (e.g., a UE 115-e). For example, the UE 115-e, upon receiving the resource configuration 320, may identify an uplink cancelation indication, and may cancel uplink transmissions (e.g., periodic or semi-persistent uplink transmissions). Here, the network entity 105-c may request that the UE 115-a cancel one or more uplink transmissions on resources that overlap (e.g., at least partially overlap) with the set of resources.

To support an SIC procedure at the network entity 105-c, the UE 115-e may cancel one or more uplink transmissions in accordance with the resource configuration 320. In a first example, the UE 115-e may cancel a physical uplink shared channel (PUSCH) transmission or a repetition of a PUSCH transmission which overlaps with a cancelation resource based on a priority of the PUSCH transmission, a type of the PUSCH transmission, or both. For example, the UE 115-e may cancel a PUSCH transmission having a lower priority (e.g., priority '0'), and may refrain from cancelling a PUSCH transmission having a higher priority (e.g., a priority greater than '0'). Additionally, or alternatively, the UE 115-e may cancel a PUSCH scheduled using a configured grant, and may refrain from cancelling a PSUCH scheduled without using a configured grant (e.g., a semi-persistently scheduled PUSCH or a dynamically granted PUSCH).

In a second example, the UE 115-e may cancel an SRS transmission that overlaps with a cancelation resource based on a type of the SRS transmission, an application of the SRS transmission, or both. For example, the UE 115-e may cancel a periodic or semi-persistent SRS transmission, and may refrain from cancelling a dynamic (e.g., aperiodic) SRS transmission. Further, the UE 115-e may cancel the SRS transmission based on identifying that the SRS transmission is a codebook-based SRS or a non-codebook-based SRS.

In a third example, the UE 115-e may cancel a physical uplink control channel (PUCCH) transmission that overlaps with a cancelation resource based on a type of the PUCCH transmission, a priority of the PUCCH transmission or both. For example, the UE 115-e may determine whether to cancel a PUCCH transmission based on the information multiplexed in the PUCCH, such as a scheduling request, a hybrid automatic repeat request (HARQ) feedback (e.g., a HARQ acknowledgment (ACK)), a periodic CSI report, a semi-persistent CSI report, or any combination thereof.

Additionally, or alternatively, the UE 115-e may cancel a PUCCH transmission having a lower priority (e.g., priority '0'), and may refrain from cancelling a PUCCH transmission having a higher priority (e.g., a priority greater than '0').

In some cases, cancelling an uplink transmission may involve the UE 115-e fully cancelling the uplink transmission or partially canceling the uplink transmission. That is, a full cancelation may indicate that the uplink transmission is fully overlapping with a cancelation resource, and a partial cancelation may indicate that the uplink transmission at least partially overlaps with a cancelation resource. In the case of partial cancelation, the uplink transmission may be partially terminated (e.g., canceled), or may be rate-matched (e.g., transmit during occasions in between transmissions at the cancelation resource).

In some examples, the resource configuration 320 may include one or more parameters of the set of resources (e.g., cancelation resources) for the network entity 105-c to use for performing an SIC procedure. For example, the resource configuration 320 may include a respective resource index for each cancelation resource, which may support semi-persistent activation and deactivation of the set of resources. Additionally, or alternatively, the configuration 320 may indicate a periodic or semi-persistently scheduled configuration of the cancelation resources, a respective set of time domain resources (e.g., a quantity of symbols) and a respective set of frequency resources (e.g., a quantity of resource blocks) for each cancelation resource, a periodicity and offset (e.g., a slot offset) of the set of cancelation resources, a type (e.g., periodic, semi-persistently scheduled, or aperiodic) and a priority level of the set of cancelation resources, uplink beams associated with the cancelation resources (e.g., uplink spatial relation information or an uplink TCI state), or any combination thereof.

In some cases, such as when the network entity 105-c configures the set of cancelation resources to be semi-persistent, the network entity 105-c may activate or deactivate the set of cancelation resources. For example, the network entity 105-c may activate the cancelation resources (e.g., resources the UE 115-e is to cancel uplink transmissions) via a first control message (e.g., a DCI or a MAC-CE), and may deactivate the cancelation resources via a second control message. Additionally, or alternatively, the network entity 105-c may transmit a first control message activating the set of cancelation resources and indicating a time duration (e.g., a validity timer), which may deactivate the set of cancelation resources upon expiration of the time duration (e.g., autonomously). In some other examples, the network entity 105-c may activate and deactivate the cancelation resources in response to an event trigger. For example, the UE 115-e changing beams (e.g., beam pairs, active TCI-states, or active spatial relation information) may act as an event trigger. That is, from the perspective of the UE 115-e, the activation and deactivation of the cancelation resources may correspond to the active beams in use by the UE 115-e. In some other cases, the event trigger may be associated with a random access channel (RACH) transmission beam (e.g., a RACH transmission beam that has not been initiated by a physical downlink control chancel (PDCCH) order).

Figure 4:
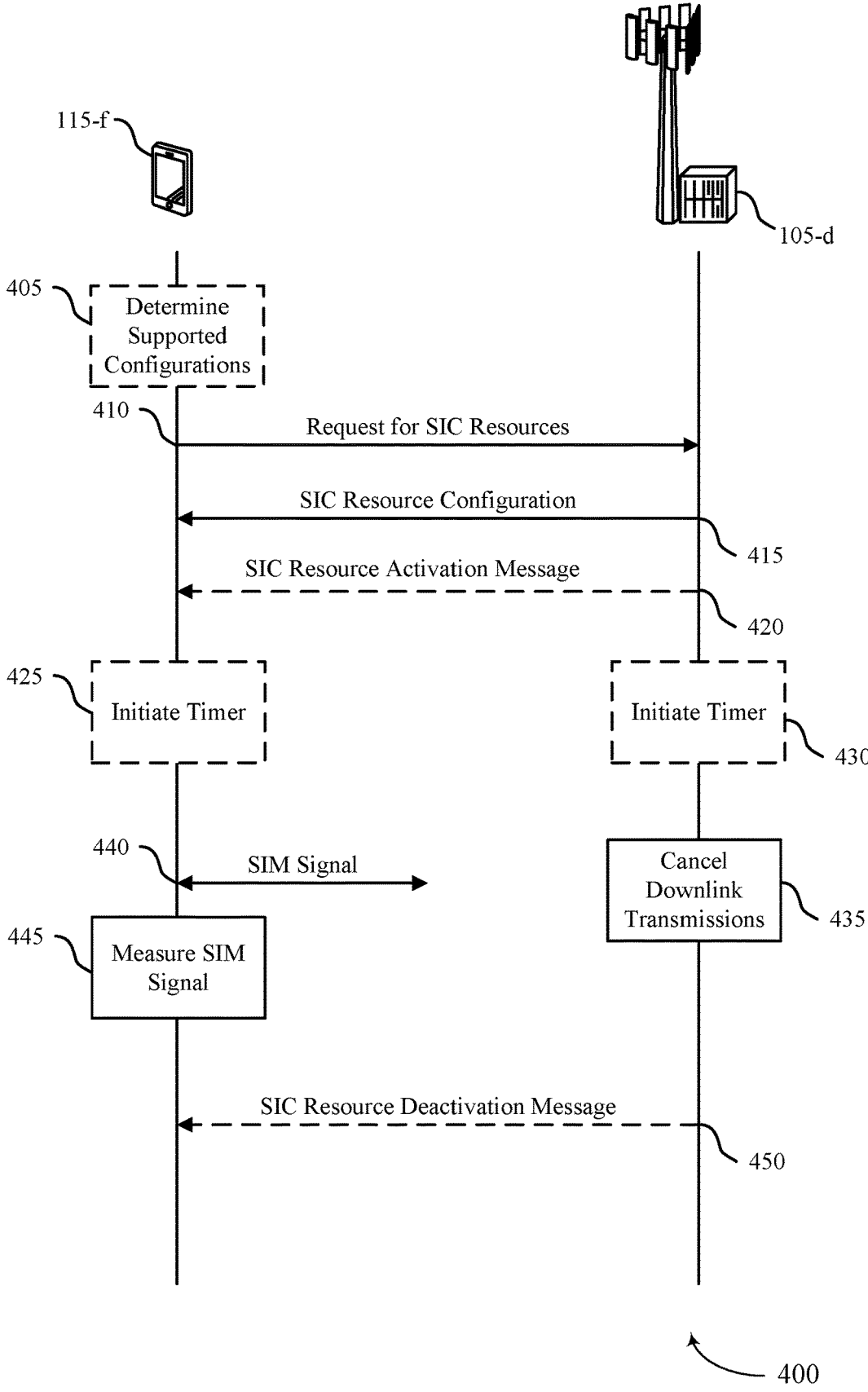
FIG. 4 illustrates an example of a process flow that supports adaptive self-interference mitigation resources for full-duplex communication in accordance with one or more aspects of the present disclosure.

FIG. 4 illustrates an example of a process flow 400 in a system that supports adaptive self-interference mitigation resources for full-duplex communication in accordance with one or more aspects of the present disclosure. In some examples, the process flow 400 may implement aspects of the wireless communications system 100, the wireless communications systems 201 and 202, and the wireless communications systems 301 and 302. The process flow 400 may illustrate an example of a fullduplex UE 115-f requesting resources for performing a self-interference mitigation procedure (e.g., for adapting one or more SIC coefficients). For example, the process flow 400 may include the UE 115-f and a network entity 105-d, which may be examples of the UE 115-d and the network entity 105-b, as described with reference to FIG. 3A. Alternative examples of the following may be implemented, where some processes are performed in a different order than described or are not performed. In some cases, processes may include additional features not mentioned below, or further processes may be added.

At 405, the UE 115-f may optionally determine one or more configurations that are supported (or preferred) by the UE 115-f. For example, the UE 115-f may identify a type of resource configuration (e.g., periodic, semi-persistent, dynamic) supported by the UE 115-f for self-interference mitigation procedures.

At 410, the UE 115-f may transmit, to the network entity 105-d, a request for SIC resources. For example, the UE 115-f request a set of time-frequency resources to perform an SIC coefficient adaptation as part of an SIC procedure. In some cases, the request for SIC resources may include a capability report of the UE 1154, assistance information for the UE 1154, a MAC-CE, a UCI signal, or any combination thereof. Additionally, or alternatively, the request for SIC resources may include the one or more configurations determined by the UE 115-e. In some cases, the one or more configurations may be included in the request for SIC resources from the UE 115-f.

In some examples, the request from the UE 115-f at 410 may optionally include a request for dynamic resources. For instance, the UE 115-f may transmit the request for dynamic resources based on a state of the UE 115-f being modified from a first state to a second state (e.g., a TCI-state change).

At 415, the network entity 105-d may transmit, to the UE 115-f, an SIC resource configuration. The SIC resource configuration may indicate one or more parameters of the SIC resources, such as a type of the resources (e.g., periodic, semi-persistent, or dynamic), a set of resource indices corresponding to the set of SIC resources, a combination of transmission and reception frequency regions (e.g., component carriers allocated to uplink transmissions and component carriers allocated to downlink transmissions), timing information, beams associated with the SIC procedure, or any combination thereof.

At 420, the network entity 105-d may optionally transmit, to the UE 115-f, an SIC resource activation message. For example, in the case that the type of the set of SIC resources is semi-persistent, the network entity 105-d may activate the resources via the SIC resource activation message. In some cases, the SIC resource activation message may be a control signal (e.g., DCI or MAC-CE). In some examples, the network entity 105-d may optionally transmit, to the UE 115-f, a downlink resource grant in response to the request for dynamic resource. The downlink resource grant may include a resource grant for the set of SIC cancelation resources for the UE 115-f to use for performing SIC procedures (e.g., self-interference mitigation procedures used to adapt SIC coefficients).

At 425 and 430, the UE 115-f and the network entity 105-d, respectively, may optionally initiate a timer in response to receiving the SIC resource activation message. In some cases, the timer (e.g., a validity timer) may indicate a duration over which the SIC resources will be active. Accordingly, the UE 115-f and/or the network entity 105-d may deactivate the SIC resource upon expiration of the timer.

At 435, the network entity 105-d may cancel one or more downlink transmissions according to the set of SIC resources. For example, the network entity 105-d may cancel dynamically scheduled transmissions that at least partially overlap with the set of SIC resources.

At 440, the UE 115-f may transmit an SIM signal as part of an SIC procedure. That is, the UE 115-f (e.g., operating in a full duplex-mode) may transmit the SIM signal via a first beam (e.g., a transmit beam), and may receive the SIM signal via a second beam (e.g., a receive beam). In some cases, the UE 115-*f* may transmit the SIM signal in accordance with the SIC resource configuration from the network entity 105-*d* (e.g., at 415). Additionally, or alternatively, the UE 115-*f* may identify a waveform and transmission power for the SIM signal based on an indication in the configuration, or may select a waveform for the SIM signal based on the configuration excluding the indication of the waveform.

At 445, the UE 115-*f* may measure the received SIM signal in order to tune one or more SIC coefficients. Adapting SIC coefficients may have increased accuracy based on the SIC resource configuration (e.g., when transmissions overlapping with the SIC resources are canceled).

At 450, the network entity 105-*d* may optionally transmit, to the UE 115-*f*, an SIC resource deactivation message (e.g., if the UE 115-*f* does not initiate a timer at 430). In some examples, the SIC resource deactivation message may deactivate the SIC resources that were activated by the SIC resource activation message (e.g., at 420). In some cases, the SIC resource deactivation message may be a control signal (e.g., DCI or MAC-CE).

Figure 5:
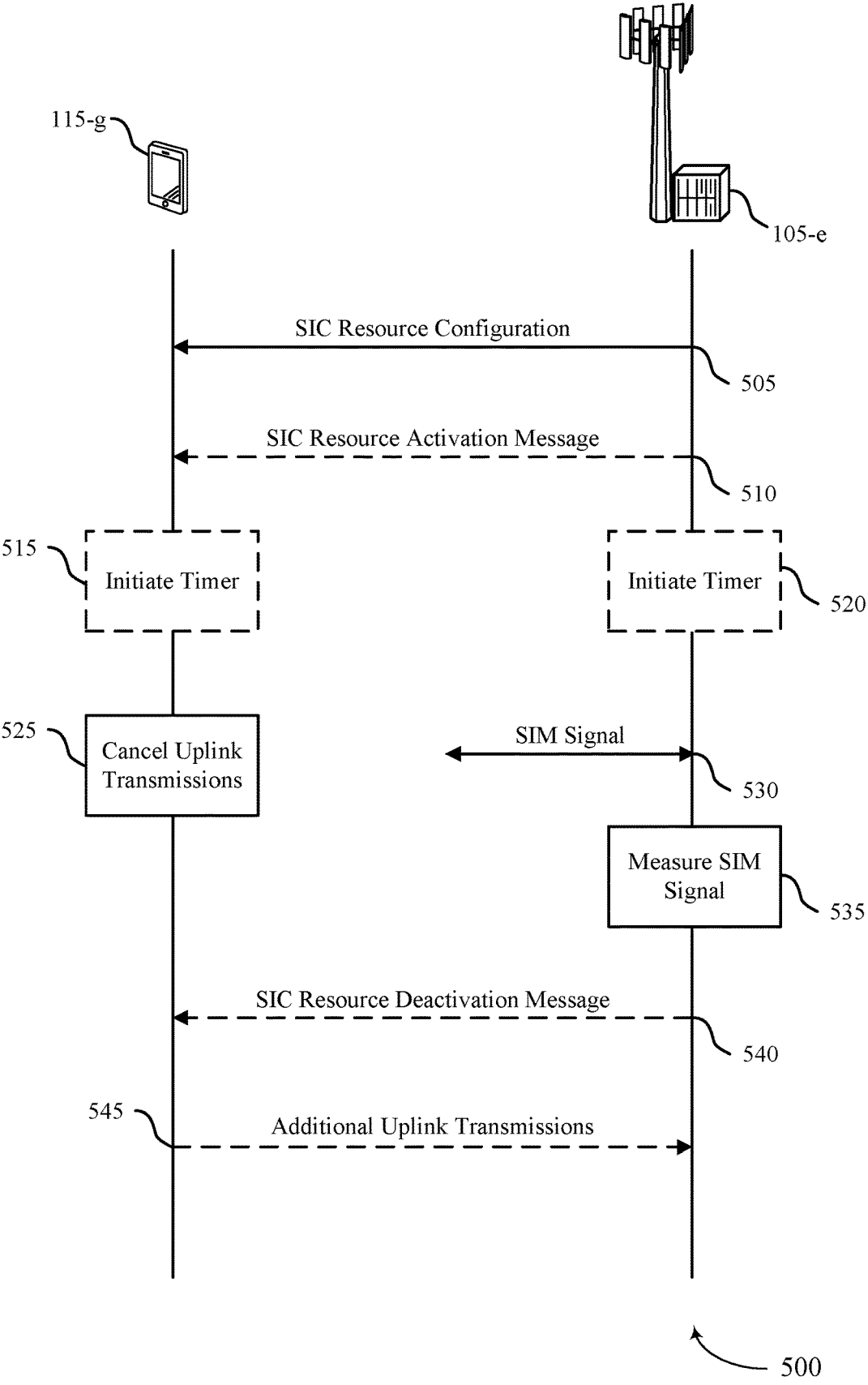
FIG. 5 illustrates an example of a process flow that supports adaptive self-interference mitigation resources for full-duplex communication in accordance with one or more aspects of the present disclosure.

FIG. 5 illustrates an example of a process flow 500 in a system that supports adaptive self-interference mitigation resources for full-duplex communication in accordance with one or more aspects of the present disclosure. In some examples, the process flow 500 may implement aspects of the wireless communications system 100, the wireless communications systems 201 and 202, and the wireless communications systems 301 and 302. The process flow 400 may illustrate an example of a full-duplex network entity 105-*e* configuring resources for performing an SIC coefficient adaptation. For example, the process flow may include the network entity 105-*e* and a UE 115-*g*, which may be examples of the full-duplex network entity 105-*c* and the UE 115-*e*, as described with reference to FIG. 3B. Alternative examples of the following may be implemented, where some processes are performed in a different order than described or are not performed. In some cases, processes may include additional features not mentioned below, or further processes may be added.

At 505, the network entity 105-*e* may transmit an SIC resource configuration to the UE 115-*g*. In some cases, the SIC resource configuration may include a set of time-frequency resources (e.g., SIC resources) via which the network entity 105-*e* will perform a self-interference mitigation procedure (e.g., a SIC procedure). In some cases, the SIC resource configuration may indicate one or more parameters of the SIC resources, such as a type of the resources (e.g., periodic, semi-persistent, or dynamic), a set of resource indices corresponding to the set of SIC resources, a combination of transmission and reception frequency regions (e.g., component carriers allocated to uplink transmissions and component carriers allocated to downlink transmissions), timing information, beams associated with the SIC procedure, or any combination thereof.

At 510, the network entity 105-*e* may transmit an SIC resource activation message. For example, in the case that the type of the set of SIC resources is semi-persistent, the network entity 105-*d* may activate the resources via the SIC resource activation message. In some cases, the SIC resource activation message may be a control signal (e.g., DCI or MAC-CE).

At 515 and 520, the UE 115-*g* and the network entity 105-*e*, respectively, may optionally initiate a timer in response to the SIC resource activation message. In some cases, the timer (e.g., a validity timer) may indicate a duration over which the SIC resources will be active.

Accordingly, the UE 115-*g* and the network entity 105-*e* may deactivate the set of SIC resources upon expiration of the timer.

At 525, the UE 115-*g* may cancel one or more uplink transmissions based on receiving the SIC resource configuration. In some cases, the UE 115-*g* may cancel the one or more uplink transmissions based on a priority associated with each of the one or more uplink transmissions, a type of the one or more uplink transmissions (e.g., periodic, semi-persistent, or dynamic), an application of the one or more uplink transmissions (e.g., a codebook based uplink transmission or non-codebook based uplink transmission), a type of information included in each of the one or more uplink transmissions (e.g., an SR, a HARQ feedback, a periodic CSI report, a semi-persistent CSI report, or any combination thereof). In some cases, the one or more uplink transmissions may include a PUSCH transmission, a repetition of a PUSCH transmission, a PUCCH, or any combination thereof.

At 530, the network entity 105-*e* may transmit an SIM signal as part of an SIC procedure. That is, the network entity 105-*e* (e.g., operating in a full duplex-mode) may transmit the SIM signal via a first beam (e.g., a transmit beam), and may receive the SIM signal via a second beam (e.g., a receive beam). In some cases, the network entity 105-*e* may transmit the SIM signal in accordance with the SIC resource configuration.

At 535, the network entity 105-*e* may measure the received SIM signal in order to tune one or more SIC coefficients. Adapting SIC coefficients may be performed with increased accuracy based on the SIC resource configuration (e.g., transmissions overlapping with the SIC resources may be canceled).

At 540, the network entity 105-*e* may optionally transmit, to the UE 115-*g*, an SIC resource deactivation message (e.g., a message deactivating the set of time-frequency resources used for self-interference mitigation procedures). In some examples, the SIC resource deactivation message may deactivate the SIC resources that were activated by the SIC resource activation message (e.g., at 515). In some cases, the SIC resource deactivation message may be a control signal (e.g., DCI or MAC-CE).

At 545, UE 115-*g* may optionally transmit one or more additional uplink transmissions based on the expiration of the timer (e.g., started at 520). For example, the UE 115-*g* may identify a quantity of uplink transmissions canceled (e.g., fully canceled or partially canceled) during the active duration of the timer, and may transmit each of the quantity of uplink transmissions upon expiration of the timer (e.g., after the network entity 105-*e* has performed SIC coefficient adaptation).

Figure 6:
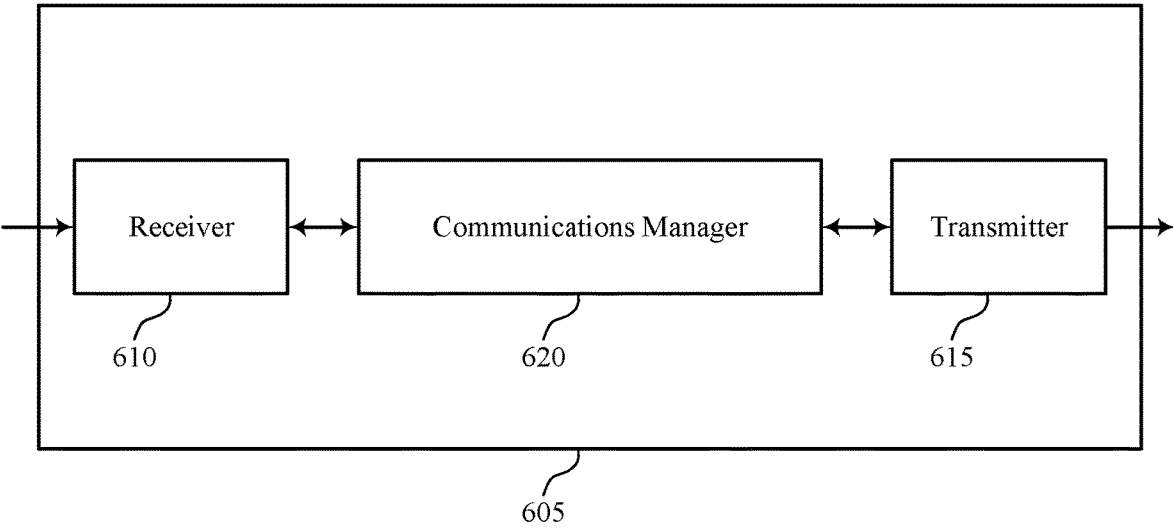
FIGS. 6 and 7 show block diagrams of devices that support adaptive self-interference mitigation resources for full-duplex communication in accordance with one or more aspects of the present disclosure.

FIG. 6 shows a block diagram 600 of a device 605 that supports adaptive self-interference mitigation resources for full-duplex communication in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to adaptive self-interference mitigation resources for full-duplex communication).

Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to adaptive self-interference mitigation resources for full-duplex communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of adaptive self-interference mitigation resources for full-duplex communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 may be configured as or otherwise support a means for transmitting a first message indicating a request for a set of time-frequency resources for performing a self-interference mitigation procedure. The communications manager 620 may be configured as or otherwise support a means for receiving, in response to the first message, a second message indicating a configuration of the set of time-frequency resources based on the request. The communications manager 620 may be configured as or otherwise support a means for transmitting a self-interference measurement signal via the set of time-frequency resources based on the configuration.

For example, the communications manager 620 may be configured as or otherwise support a means for receiving, from a network entity, a message indicating a configuration of a set of time-frequency resources for a self-interference mitigation procedure, the set of time-frequency resources including periodic resources or semi-persistent resources, or both. The communications manager 620 may be configured as or otherwise support a means for canceling one or more uplink transmissions from the UE based on the configuration, where time-frequency resources associated with the one or more uplink transmissions at least partially overlap with the set of time-frequency resources.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for increased reliability of SIC coefficient adaptation, thereby increasing communication reliability in full-duplex, which may support low latency communications and increased user experience.

Figure 7:
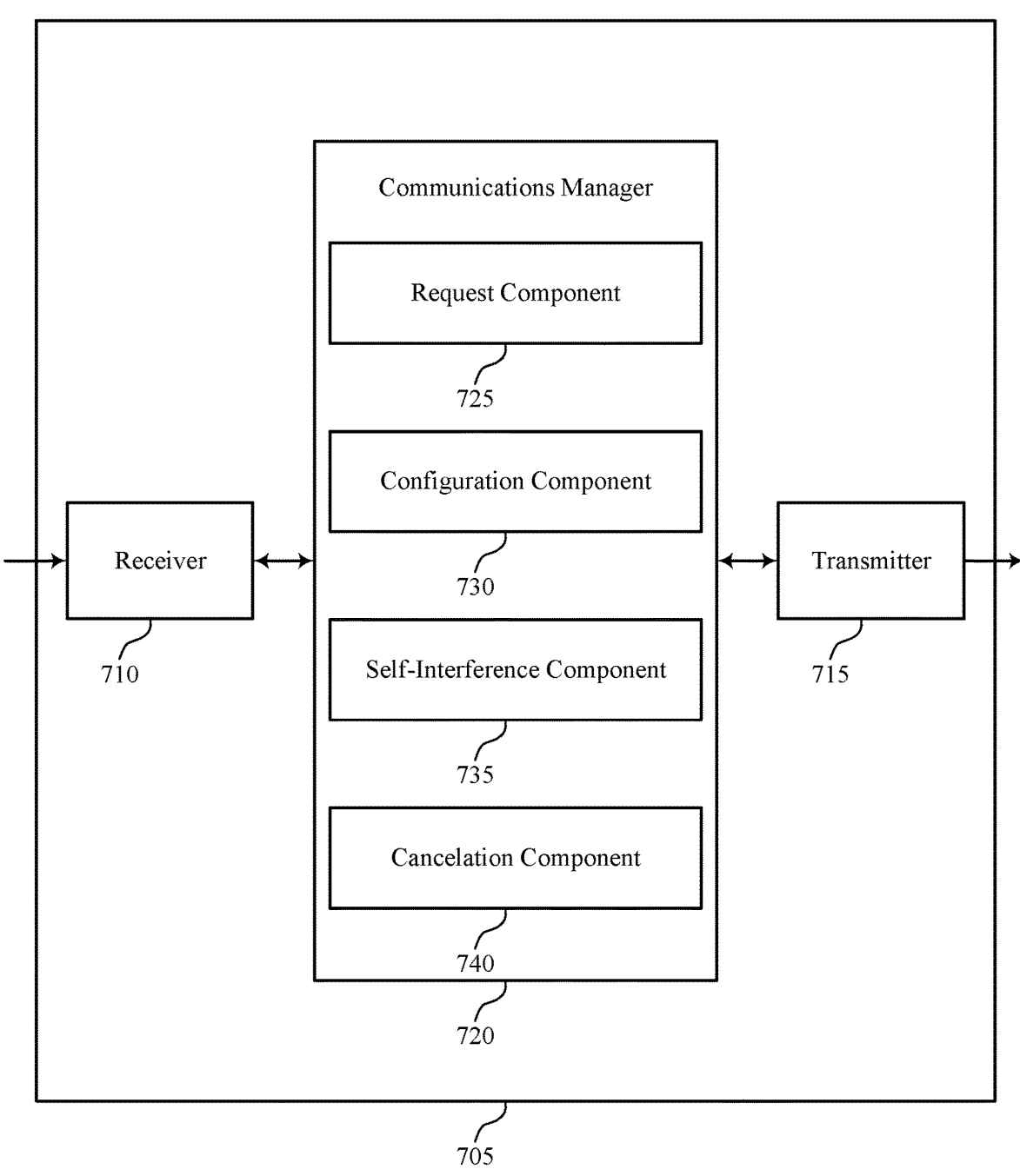

FIG. 7 shows a block diagram 700 of a device 705 that supports adaptive self-interference mitigation resources for full-duplex communication in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to adaptive self-interference mitigation resources for full-duplex communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to adaptive self-interference mitigation resources for full-duplex communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of adaptive self-interference mitigation resources for full-duplex communication as described herein. For example, the communications manager 720 may include a request component 725, a configuration component 730, a self-interference component 735, a cancelation component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The request component 725 may be configured as or otherwise support a means for transmitting a first message indicating a request for a set of time-frequency resources for performing a self-interference mitigation procedure. The configuration component 730 may be configured as or otherwise support a means for receiving, in response to the first message, a second message indicating a configuration of the set of time-frequency resources based on the request. The self-interference component 735 may be configured as or otherwise support a means for transmitting a self-interference measurement signal via the set of time-frequency resources based on the configuration.

The configuration component 730 may be configured as or otherwise support a means for receiving, from a network entity, a message indicating a configuration of a set of time-frequency resources for a self-interference mitigation procedure, the set of time-frequency resources including periodic resources or semi-persistent resources, or both. The cancelation component 740 may be configured as or otherwise support a means for canceling one or more uplink transmissions from the UE based on the configuration, where time-frequency resources associated with the one or more uplink transmissions at least partially overlap with the set of time-frequency resources.

Figure 8:
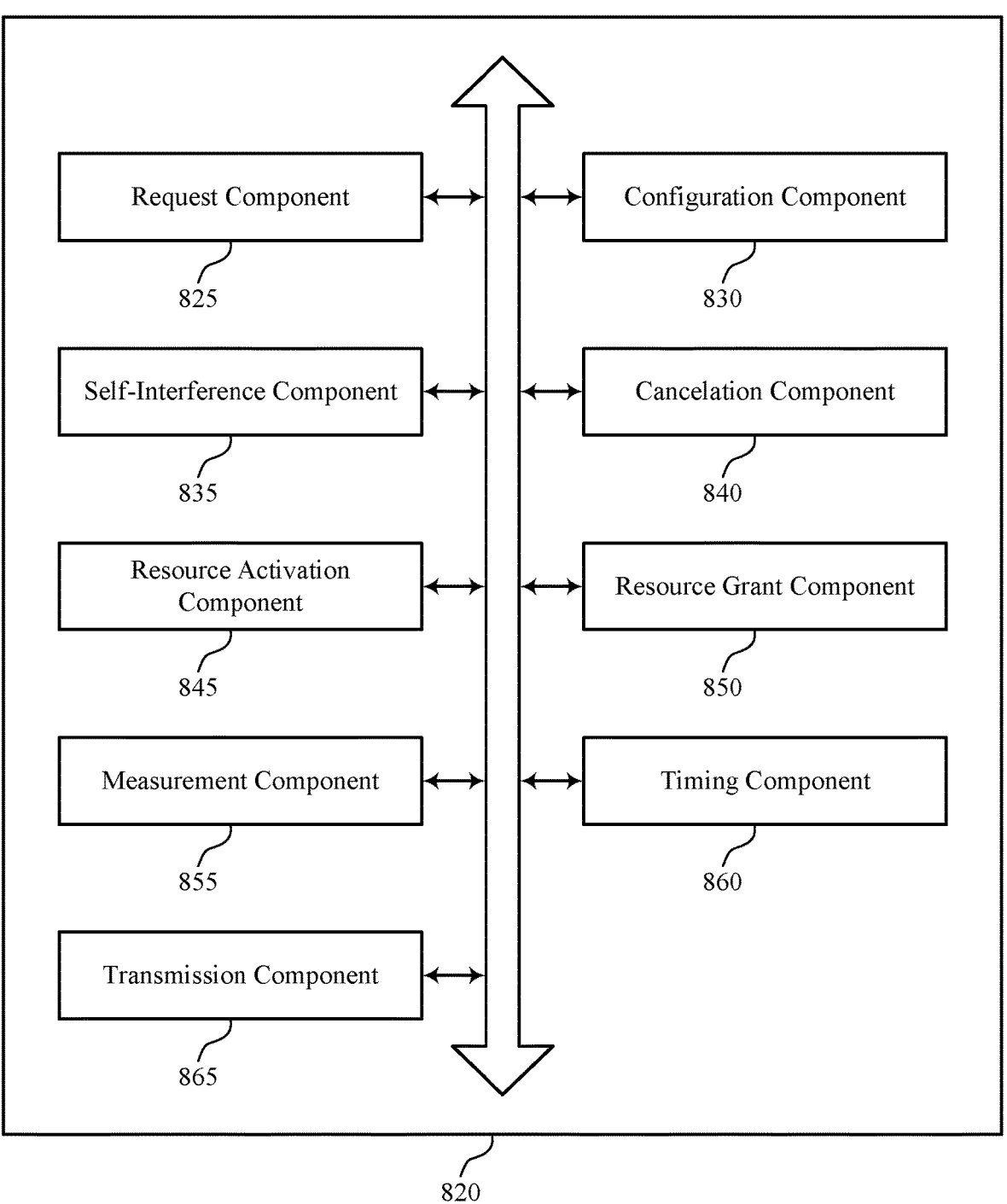
FIG. 8 shows a block diagram of a communications manager that supports adaptive self-interference mitigation resources for full-duplex communication in accordance with one or more aspects of the present disclosure.

FIG. 8 shows a block diagram 800 of a communications manager 820 that supports adaptive self-interference mitigation resources for full-duplex communication in accordance with one or more aspects of the present disclosure. The communications manager 820 may be an example of aspects of a communications manager 620, a communications manager 720, or both, as described herein. The communications manager 820, or various components thereof, may be an example of means for performing various aspects of adaptive self-interference mitigation resources for full-duplex communication as described herein. For example, the communications manager 820 may include a request component 825, a configuration component 830, a self-interference component 835, a cancelation component 840, a resource activation component 845, a resource grant component 850, a measurement component 855, a timing component 860, a transmission component 865, or any combination thereof. Each of these components may communicate, directly or indirectly, with one another (e.g., via one or more buses).

The request component 825 may be configured as or otherwise support a means for transmitting a first message indicating a request for a set of time-frequency resources for performing a self-interference mitigation procedure. The configuration component 830 may be configured as or otherwise support a means for receiving, in response to the first message, a second message indicating a configuration of the set of time-frequency resources based on the request. The self-interference component 835 may be configured as or otherwise support a means for transmitting a self-interference measurement signal via the set of time-frequency resources based on the configuration.

In some examples, to support transmitting the self-interference measurement signal, the self-interference component 835 may be configured as or otherwise support a means for transmitting the self-interference measurement signal in accordance with a type of resources included in the set of time-frequency resources, the type of resources including periodic resources, semi-persistent resources, dynamic resources, or any combination thereof, and where the configuration indicates the type of resources.

In some examples, the type of resources includes the semi-persistent resources, and the resource activation component 845 may be configured as or otherwise support a means for receiving a first control message activating the set of time-frequency resources, where the self-interference measurement signal is transmitted based on the first control message activating the set of time-frequency resources.

In some examples, the timing component 860 may be configured as or otherwise support a means for starting a timer in response to receiving the first control message activating the set of time-frequency resources. In some examples, the resource activation component 845 may be configured as or otherwise support a means for deactivating the set of time-frequency resources based on an expiration of the timer.

In some examples, the resource activation component 845 may be configured as or otherwise support a means for receiving a second control message deactivating the set of time-frequency resources.

In some examples, the type of resources includes the dynamic resources, and the request component 825 may be configured as or otherwise support a means for transmitting a request for the set of time-frequency resources based on a state of the UE being modified from a first state to a second state that is different from the first state. In some examples, the type of resources includes the dynamic resources, and the resource grant component 850 may be configured as or otherwise support a means for receiving, in response to the request, downlink control information including a resource grant for the set of time-frequency resources, where the self-interference measurement signal is transmitted in response to the resource grant.

In some examples, to support transmitting the self-interference measurement signal, the self-interference component 835 may be configured as or otherwise support a means for transmitting the self-interference measurement signal based on one or more resource indices corresponding to respective time-frequency resources of the set of time-frequency resources, where the configuration indicates the one or more resource indices.

In some examples, the configuration component 830 may be configured as or otherwise support a means for determining one or more configurations of the set of time-frequency resources that are supported by the UE for performing the self-interference mitigation procedure, where the first message indicates the one or more configurations.

In some examples, the self-interference component 835 may be configured as or otherwise support a means for performing the self-interference mitigation procedure using one or more component carriers associated with a frequency region, the frequency region including one or more uplink frequency regions of a bandwidth, one or more downlink frequency regions of the bandwidth, or both, where the configuration indicates the frequency region.

In some examples, the self-interference measurement signal is transmitted via a first component carrier of the one or more component carriers, and the measurement component 855 may be configured as or otherwise support a means for performing measurements of the self-interference measurement signal via a second component carrier of the one or more component carriers based on the configuration.

In some examples, the self-interference component 835 may be configured as or otherwise support a means for identifying a waveform and a transmit power for transmitting the self-interference measurement signal based on the configuration, where the self-interference measurement signal includes the waveform and is transmitted using the transmit power.

In some examples, the self-interference component 835 may be configured as or otherwise support a means for selecting a waveform for the self-interference measurement signal based on the configuration excluding an indication of the waveform, where the self-interference measurement signal includes the waveform.

In some examples, the resource activation component 845 may be configured as or otherwise support a means for receiving a first control message activating the set of time-frequency resources in response to a first event trigger, where the self-interference measurement signal is transmitted based on the first event trigger.

In some examples, the resource activation component 845 may be configured as or otherwise support a means for receiving a second control message deactivating the set of time-frequency resources in response to a second event trigger.

In some examples, the first event trigger includes one or beam pairs activated at the UE, a link quality measurement, or any combination thereof.

In some examples, to support transmitting the self-interference measurement signal, the self-interference component 835 may be configured as or otherwise support a means for transmitting the self-interference measurement signal in accordance with one or more time regions, a quantity of symbols, a periodicity, an offset value, or any combination thereof, where the configuration indicates the one or more time regions, the quantity of symbols, the periodicity, the offset value, or any combination thereof.

In some examples, the self-interference component 835 may be configured as or otherwise support a means for identifying an uplink beam and a downlink beam associated with the set of time-frequency resources based on the configuration, the configuration indicating an uplink transmission configuration indicator state, an uplink spatial relation, a downlink transmission configuration indicator state, or any combination thereof, where the self-interference mitigation procedure is performed using the uplink beam and the downlink beam.

In some examples, the first message includes a UE capability report, UE assistance information, a MAC control element, uplink control information, or any combination thereof.

In some examples, the configuration component 830 may be configured as or otherwise support a means for receiving, from a network entity, a message indicating a configuration of a set of time-frequency resources for a self-interference mitigation procedure, the set of time-frequency resources including periodic resources or semi-persistent resources, or both. The cancelation component 840 may be configured as or otherwise support a means for canceling one or more uplink transmissions from the UE based on the configuration, where time-frequency resources associated with the one or more uplink transmissions at least partially overlap with the set of time-frequency resources.

In some examples, the set of time-frequency resources includes the semi-persistent resources, and the resource activation component 845 may be configured as or otherwise support a means for receiving a first control message activating the set of time-frequency resources, where the one or more uplink transmissions are canceled in response to receiving the first control message activating the set of time-frequency resources.

In some examples, the timing component 860 may be configured as or otherwise support a means for starting a timer in response to receiving the first control message activating the set of time-frequency resources. In some examples, the transmission component 865 may be configured as or otherwise support a means for transmitting one or more additional uplink transmissions based on an expiration of the timer.

In some examples, the resource activation component 845 may be configured as or otherwise support a means for receiving a second control message deactivating the set of time-frequency resources. In some examples, the transmission component 865 may be configured as or otherwise support a means for transmitting one or more additional uplink transmissions in response to receiving the second control message deactivating the set of time-frequency resources.

In some examples, the resource activation component 845 may be configured as or otherwise support a means for determining that the set of time-frequency resources are activated based on one or more events, where the one or more uplink transmissions are canceled based on the set of time-frequency resources being activated.

In some examples, the one or more events include a beam change at the UE, an activation of one or more uplink beams, or both.

In some examples, to support canceling the one or more uplink transmissions, the cancelation component 840 may be configured as or otherwise support a means for canceling the one or more uplink transmissions based on a priority associated with each of the one or more uplink transmissions, the one or more uplink transmissions including a physical uplink shared channel transmission, a repetition of a physical uplink shared channel transmission, a physical uplink control channel, or any combination thereof.

In some examples, to support canceling the one or more uplink transmissions, the cancelation component 840 may be configured as or otherwise support a means for canceling the one or more uplink transmissions based on a transmission type of the one or more uplink transmissions.

In some examples, the transmission type includes a semi-persistently scheduled physical uplink shared channel transmission, a dynamically-granted physical uplink shared channel transmission, a periodic sounding reference signal transmission, a semi-persistent sounding reference signal transmission, or any combination thereof.

In some examples, to support canceling the one or more uplink transmissions, the cancelation component 840 may be configured as or otherwise support a means for canceling the one or more uplink transmissions based on an application of the one or more uplink transmissions, the application including a codebook-based sounding reference signal or a non-codebook-based sounding reference signal, or both.

In some examples, to support canceling the one or more uplink transmissions, the cancelation component 840 may be configured as or otherwise support a means for canceling the one or more uplink transmissions based on a type of information included in each of the one or more uplink transmissions, the type of information including a scheduling request, hybrid automatic repeat request feedback, periodic channel state information, semi-persistent channel state information, or any combination thereof.

In some examples, to support canceling the one or more uplink transmissions, the cancelation component 840 may be configured as or otherwise support a means for canceling at least a portion of the one or more uplink transmissions based on the time-frequency resources at least partially overlapping with the set of time-frequency resources.

In some examples, to support canceling the one or more uplink transmissions, the cancelation component 840 may be configured as or otherwise support a means for performing rate matching around the set of time-frequency resources based on the configuration.

In some examples, the configuration of the set of time-frequency resources includes an indication of one or more resource indices corresponding to respective time-frequency resources of the set of time-frequency resources, a type of resources included in the set of time-frequency resources, one or more time regions, one or more frequency regions, a periodicity, an offset value, one or more uplink beams associated with the set of time-frequency resources, or any combination thereof.

Figure 9:
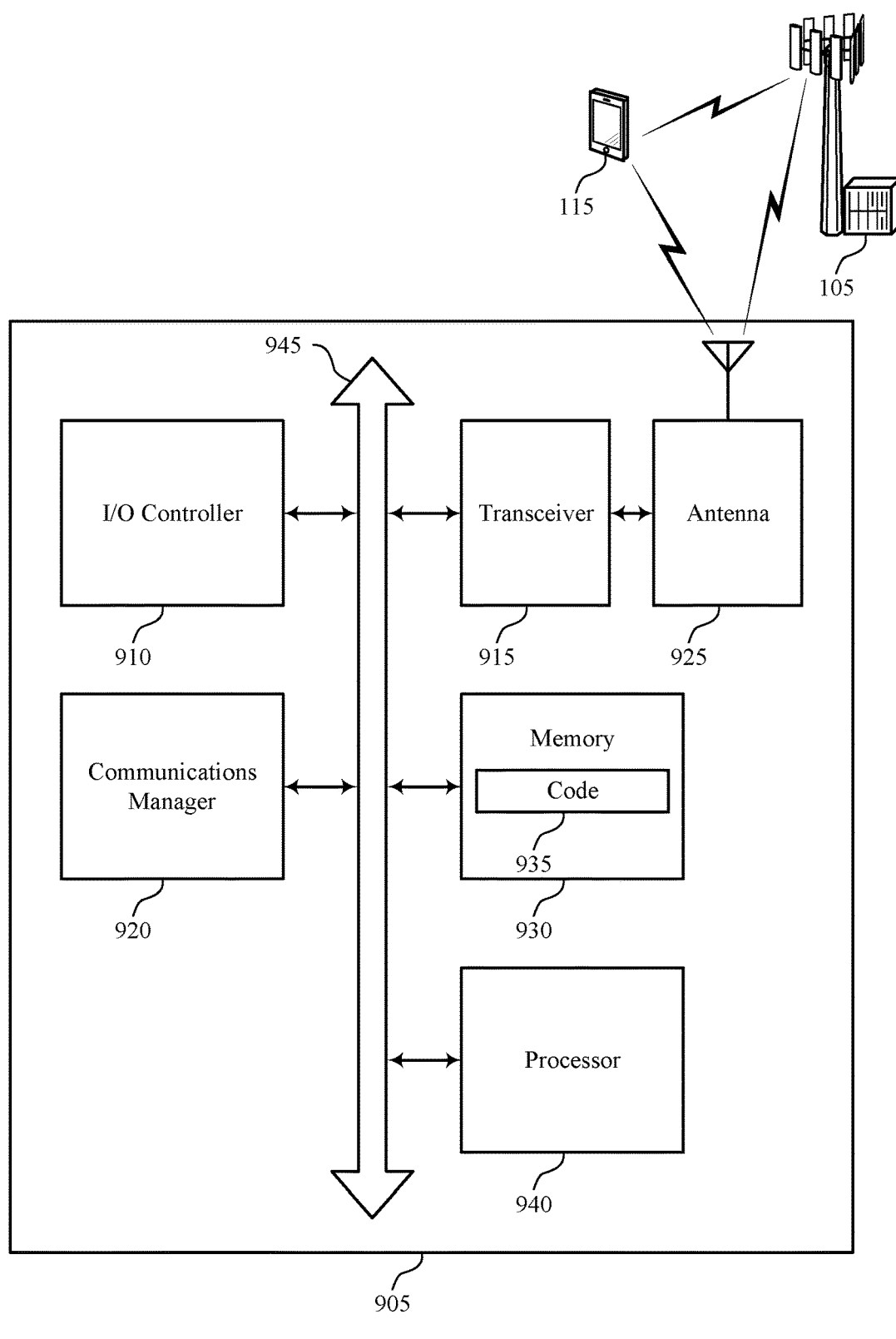
FIG. 9 shows a diagram of a system including a device that supports adaptive self-interference mitigation resources for full-duplex communication in accordance with one or more aspects of the present disclosure.

FIG. 9 shows a diagram of a system 900 including a device 905 that supports adaptive self-interference mitigation resources for full-duplex communication in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting adaptive self-interference mitigation resources for full-duplex communication). For example, the device 905 or a component of the device 905 may include a processor 940 and memory 930 coupled with or to the processor 940, the processor 940 and memory 930 configured to perform various functions described herein.

For example, the communications manager 920 may be configured as or otherwise support a means for transmitting a first message indicating a request for a set of time-frequency resources for performing a self-interference mitigation procedure. The communications manager 920 may be configured as or otherwise support a means for receiving, in response to the first message, a second message indicating a configuration of the set of time-frequency resources based on the request. The communications manager 920 may be configured as or otherwise support a means for transmitting a self-interference measurement signal via the set of time-frequency resources based on the configuration.

For example, the communications manager 920 may be configured as or otherwise support a means for receiving, from a network entity, a message indicating a configuration of a set of time-frequency resources for a self-interference mitigation procedure, the set of time-frequency resources including periodic resources or semi-persistent resources, or both. The communications manager 920 may be configured as or otherwise support a means for canceling one or more uplink transmissions from the UE based on the configuration, where time-frequency resources associated with the one or more uplink transmissions at least partially overlap with the set of time-frequency resources.

By including or configuring the communications manager 920 in accordance with examples as described herein, the device 905 may support techniques for increased reliability of SIC coefficient adaptation, thereby increasing communication reliability in full-duplex, which may support increased user experience due to low latency communications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of adaptive self-interference mitigation resources for full-duplex communication as described herein, or the processor 940 and the memory 930 may be otherwise configured to perform or support such operations.

Figure 10:
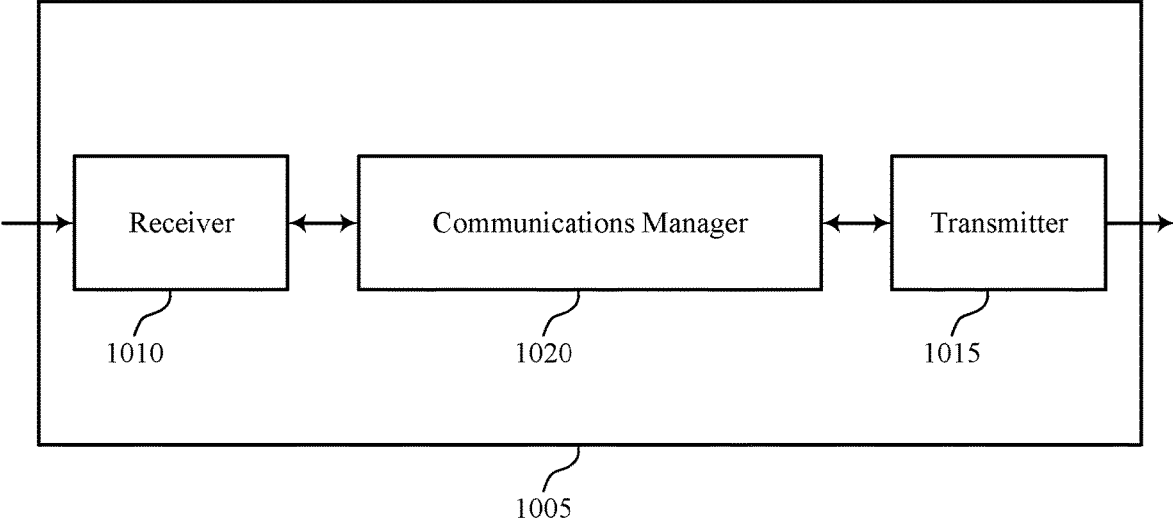
FIGS. 10 and 11 show block diagrams of devices that support adaptive self-interference mitigation resources for full-duplex communication in accordance with one or more aspects of the present disclosure.

FIG. 10 shows a block diagram 1000 of a device 1005 that supports adaptive self-interference mitigation resources for full-duplex communication in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of adaptive self-interference mitigation resources for full-duplex communication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

For example, the communications manager 1020 may be configured as or otherwise support a means for receiving a first message indicating a request for a set of time-frequency resources for a self-interference mitigation procedure at a UE. The communications manager 1020 may be configured as or otherwise support a means for transmitting, in response to the first message, a second message indicating a configuration of the set of time-frequency resources based on the request. The communications manager 1020 may be configured as or otherwise support a means for canceling one or more downlink transmissions based on the configuration, where time-frequency resources associated with the one or more downlink transmissions at least partially overlap with the set of time-frequency resources.

For example, the communications manager 1020 may be configured as or otherwise support a means for transmitting a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration. The communications manager 1020 may be configured as or otherwise support a means for transmitting a self-interference measurement signal via the set of time-frequency resources.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for increased reliability of SIC coefficient adaptation, thereby increasing communication reliability in full-duplex, which may support increased user experience due to low latency communications.

Figure 11:
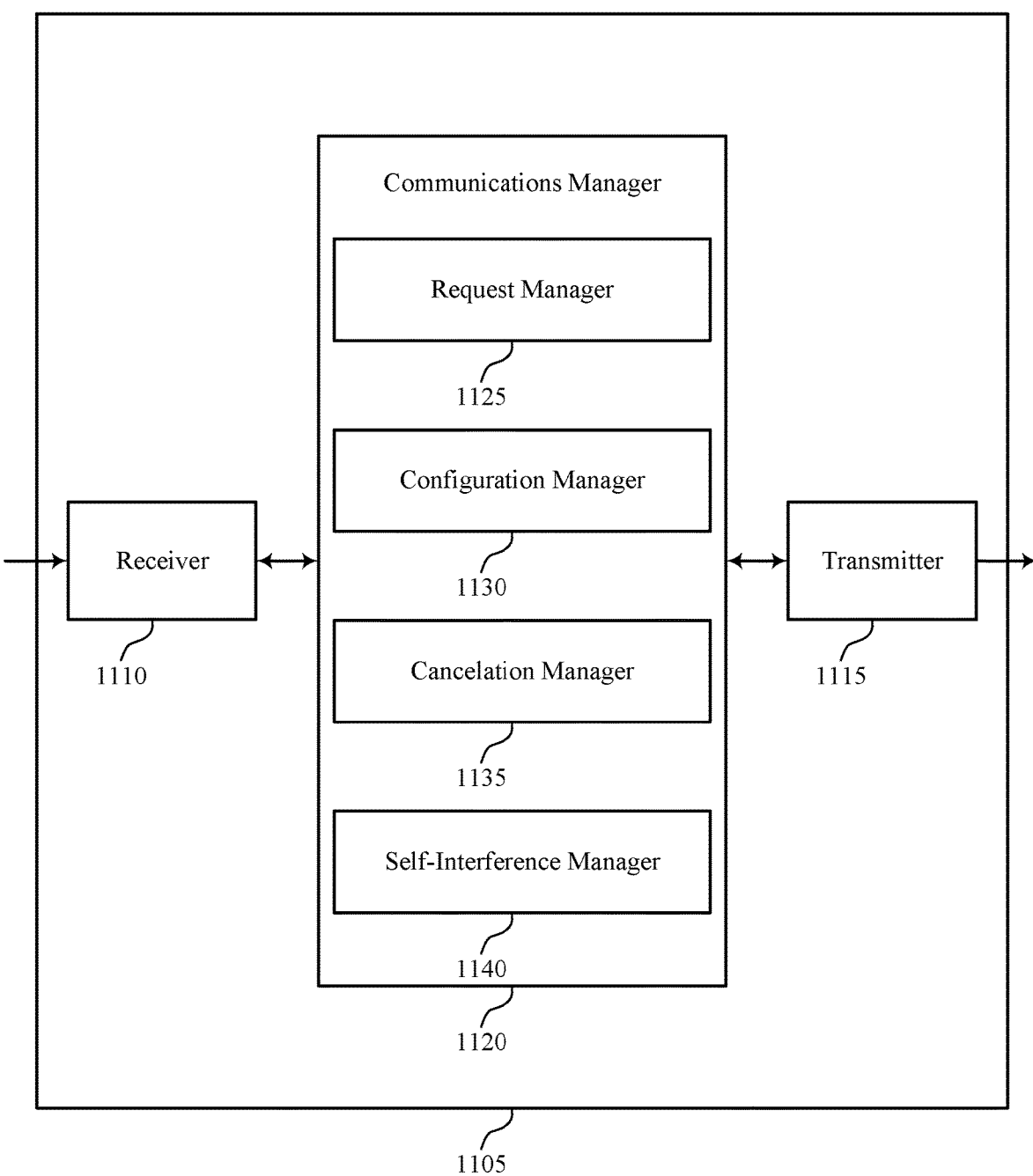

FIG. 11 shows a block diagram 1100 of a device 1105 that supports adaptive self-interference mitigation resources for full-duplex communication in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of adaptive self-interference mitigation resources for full-duplex communication as described herein. For example, the communications manager 1120 may include a request manager 1125, a configuration manager 1130, a cancelation manager 1135, a self-interference manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The request manager 1125 may be configured as or otherwise support a means for receiving a first message indicating a request for a set of time-frequency resources for a self-interference mitigation procedure at a UE. The configuration manager 1130 may be configured as or otherwise support a means for transmitting, in response to the first message, a second message indicating a configuration of the set of time-frequency resources based on the request. The cancelation manager 1135 may be configured as or otherwise support a means for canceling one or more downlink transmissions based on the configuration, where time-frequency resources associated with the one or more downlink transmissions at least partially overlap with the set of time-frequency resources.

The configuration manager 1130 may be configured as or otherwise support a means for transmitting a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration. The self-interference manager 1140 may be configured as or otherwise support a means for transmitting a self-interference measurement signal via the set of time-frequency resources.

Figure 12:
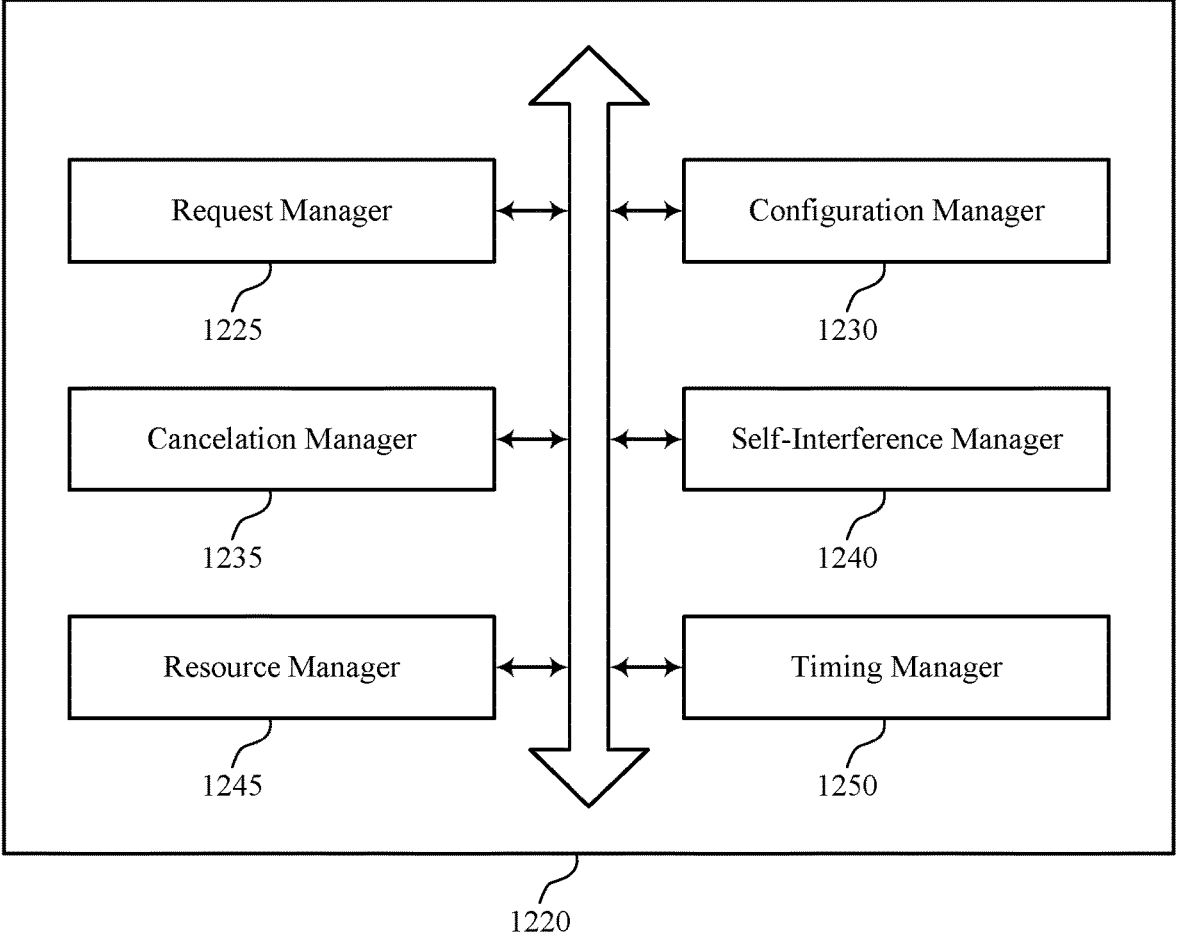
FIG. 12 shows a block diagram of a communications manager that supports adaptive self-interference mitigation resources for full-duplex communication in accordance with one or more aspects of the present disclosure.

FIG. 12 shows a block diagram 1200 of a communications manager 1220 that supports adaptive self-interference mitigation resources for full-duplex communication in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of adaptive self-interference mitigation resources for full-duplex communication as described herein. For example, the communications manager 1220 may include a request manager 1225, a configuration manager 1230, a cancelation manager 1235, a self-interference manager 1240, a resource manager 1245, a timing manager 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The request manager 1225 may be configured as or otherwise support a means for receiving a first message indicating a request for a set of time-frequency resources for a self-interference mitigation procedure at a UE. The configuration manager 1230 may be configured as or otherwise support a means for transmitting, in response to the first message, a second message indicating a configuration of the set of time-frequency resources based on the request. The cancelation manager 1235 may be configured as or otherwise support a means for canceling one or more downlink transmissions based on the configuration, where time-frequency resources associated with the one or more downlink transmissions at least partially overlap with the set of time-frequency resources.

In some examples, to support transmitting the second message, the resource manager 1245 may be configured as or otherwise support a means for transmitting the second message including an indication of a type of resources included in the set of time-frequency resources, the type of resources including periodic resources, semi-persistent resources, dynamic resources, or any combination thereof.

In some examples, the type of resources includes the semi-persistent resources, and the resource manager 1245 may be configured as or otherwise support a means for transmitting a first control message activating the set of time-frequency resources, where the one or more downlink transmissions are canceled based on the first control message activating the set of time-frequency resources.

In some examples, the resource manager 1245 may be configured as or otherwise support a means for transmitting a second control message deactivating the set of time-frequency resources.

In some examples, the first control message activating the set of time-frequency resources is transmitted in response to a first event trigger, the first event trigger including one or more beam pairs activated at the UE, a link quality measurement, or any combination thereof.

In some examples, the resource manager 1245 may be configured as or otherwise support a means for transmitting a second control message deactivating the set of time-frequency resources in response to a second event trigger.

In some examples, the type of resources includes the dynamic resources, and the request manager 1225 may be configured as or otherwise support a means for receiving a request for the set of time-frequency resources based on a state of the UE being modified from a first state to a second state that is different from the first state. In some examples, the type of resources includes the dynamic resources, and the resource manager 1245 may be configured as or otherwise support a means for transmitting, in response to the request, downlink control information including a resource grant for the set of time-frequency resources, where the one or more downlink transmissions are canceled based on the resource grant.

In some examples, the configuration manager 1230 may be configured as or otherwise support a means for transmitting a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration. The self-interference manager 1240 may be configured as or otherwise support a means for transmitting a self-interference measurement signal via the set of time-frequency resources.

In some examples, the set of time-frequency resources includes the semi-persistent resources, and the resource manager 1245 may be configured as or otherwise support a means for transmitting a first control message activating the set of time-frequency resources, where the self-interference measurement signal is transmitted in response to transmitting the first control message activating the set of time-frequency resources.

In some examples, the timing manager 1250 may be configured as or otherwise support a means for starting a timer in response to transmitting the first control message activating the set of time-frequency resources. In some examples, the resource manager 1245 may be configured as or otherwise support a means for deactivating the set of time-frequency resources based on an expiration of the timer.

In some examples, the resource manager 1245 may be configured as or otherwise support a means for transmitting a second control message deactivating the set of time-frequency resources.

In some examples, the resource manager 1245 may be configured as or otherwise support a means for activating the set of time-frequency resources based on one or more events, where the self-interference measurement signal is transmitted based on the set of time-frequency resources being activated, the one or more events including a beam change at the UE, an activation of one or more uplink beams, or both.

In some examples, the configuration of the set of time-frequency resources includes an indication of one or more resource indices corresponding to respective time-frequency resources of the set of time-frequency resources, a type of resources included in the set of time-frequency resources, one or more time regions, one or more frequency regions, a periodicity, an offset value, one or more uplink beams associated with the set of time-frequency resources, or any combination thereof.

Figure 13:
FIG. 13 shows a diagram of a system including a device that supports adaptive self-interference mitigation resources for full-duplex communication in accordance with one or more aspects of the present disclosure.

FIG. 13 shows a diagram of a system 1300 including a device 1305 that supports adaptive self-interference mitigation resources for full-duplex communication in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting adaptive self-interference mitigation resources for full-duplex communication). For example, the device 1305 or a component of the device 1305 may include a processor 1335 and memory 1325 coupled with the processor 1335, the processor 1335 and memory 1325 configured to perform various functions described herein.

The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305.

The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

For example, the communications manager 1320 may be configured as or otherwise support a means for receiving a first message indicating a request for a set of time-frequency resources for a self-interference mitigation procedure at a UE. The communications manager 1320 may be configured as or otherwise support a means for transmitting, in response to the first message, a second message indicating a configuration of the set of time-frequency resources based on the request. The communications manager 1320 may be configured as or otherwise support a means for canceling one or more downlink transmissions based on the configuration, where time-frequency resources associated with the one or more downlink transmissions at least partially overlap with the set of time-frequency resources.

For example, the communications manager 1320 may be configured as or otherwise support a means for transmitting a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration. The communications manager 1320 may be configured as or otherwise support a means for transmitting a self-interference measurement signal via the set of time-frequency resources.

By including or configuring the communications manager 1320 in accordance with examples as described herein, the device 1305 may support techniques for increased reliability of SIC coefficient adaptation, thereby increasing communication reliability in full-duplex, which may support increased user experience due to low latency communications.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of adaptive self-interference mitigation resources for full-duplex communication as described herein, or the processor 1335 and the memory 1325 may be otherwise configured to perform or support such operations.

FIG. 14 shows a flowchart illustrating a method 1400 that supports adaptive self-interference mitigation resources for full-duplex communication in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting a first message indicating a request for a set of time-frequency resources for performing a self-interference mitigation procedure. The operations of 1405 may be performed in accordance with examples as disclosed herein. In some examples, aspects of the operations of 1405 may be performed by a request component 825 as described with reference to FIG. 8.

At 1410, the method may include receiving, in response to the first message, a second message indicating a configuration of the set of time-frequency resources based on the request. The operations of 1410 may be performed in accordance with examples as disclosed herein. In some examples, aspects of the operations of 1410 may be performed by a configuration component 830 as described with reference to FIG. 8.

At 1415, the method may include transmitting a self-interference measurement signal via the set of time-frequency resources based on the configuration. The operations of 1415 may be performed in accordance with examples as disclosed herein. In some examples, aspects of the operations of 1415 may be performed by a self-interference component 835 as described with reference to FIG. 8.

FIG. 15 shows a flowchart illustrating a method 1500 that supports adaptive self-interference mitigation resources for full-duplex communication in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting a first message indicating a request for a set of time-frequency resources for performing a self-interference mitigation procedure. The operations of 1505 may be performed in accordance with examples as disclosed herein. In some examples, aspects of the operations of 1505 may be performed by a request component 825 as described with reference to FIG. 8.

At 1510, the method may include receiving, in response to the first message, a second message indicating a configuration of the set of time-frequency resources based on the request. The operations of 1510 may be performed in accordance with examples as disclosed herein. In some examples, aspects of the operations of 1510 may be performed by a configuration component 830 as described with reference to FIG. 8.

At 1515, the method may include transmitting a self-interference measurement signal via the set of time-frequency resources based on the configuration. The operations of 1515 may be performed in accordance with examples as disclosed herein. In some examples, aspects of the operations of 1515 may be performed by a self-interference component 835 as described with reference to FIG. 8.

At 1520, the method may include transmitting the self-interference measurement signal in accordance with a type of resources included in the set of time-frequency resources, the type of resources including periodic resources, semi-persistent resources, dynamic resources, or any combination thereof, and where the configuration indicates the type of resources. The operations of 1520 may be performed in accordance with examples as disclosed herein. In some examples, aspects of the operations of 1520 may be performed by a self-interference component 835 as described with reference to FIG. 8.

FIG. 16 shows a flowchart illustrating a method 1600 that supports adaptive self-interference mitigation resources for full-duplex communication in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions.

Additionally, or alternatively, the UE may perform aspects of the described functions using special-purpose hardware.

At 1605, the method may include transmitting a first message indicating a request for a set of time-frequency resources for performing a self-interference mitigation procedure. The operations of 1605 may be performed in accordance with examples as disclosed herein. In some examples, aspects of the operations of 1605 may be performed by a request component 825 as described with reference to FIG. 8.

At 1610, the method may include receiving, in response to the first message, a second message indicating a configuration of the set of time-frequency resources based on the request. The operations of 1610 may be performed in accordance with examples as disclosed herein. In some examples, aspects of the operations of 1610 may be performed by a configuration component 830 as described with reference to FIG. 8.

At 1615, the method may include receiving a first control message activating the set of time-frequency resources in response to a first event trigger, where the self-interference measurement signal is transmitted based on the first event trigger. The operations of 1615 may be performed in accordance with examples as disclosed herein. In some examples, aspects of the operations of 1615 may be performed by a resource activation component 845 as described with reference to FIG. 8.

At 1620, the method may include transmitting a self-interference measurement signal via the set of time-frequency resources based on the configuration. The operations of 1620 may be performed in accordance with examples as disclosed herein. In some examples, aspects of the operations of 1620 may be performed by a self-interference component 835 as described with reference to FIG. 8.

FIG. 17 shows a flowchart illustrating a method 1700 that supports adaptive self-interference mitigation resources for full-duplex communication in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, a message indicating a configuration of a set of time-frequency resources for a self-interference mitigation procedure, the set of time-frequency resources including periodic resources or semi-persistent resources, or both. The operations of 1705 may be performed in accordance with examples as disclosed herein. In some examples, aspects of the operations of 1705 may be performed by a configuration component 830 as described with reference to FIG. 8.

At 1710, the method may include canceling one or more uplink transmissions from the UE based on the configuration, where time-frequency resources associated with the one or more uplink transmissions at least partially overlap with the set of time-frequency resources. The operations of 1710 may be performed in accordance with examples as disclosed herein. In some examples, aspects of the operations of 1710 may be performed by a cancelation component 840 as described with reference to FIG. 8.

FIG. 18 shows a flowchart illustrating a method 1800 that supports adaptive self-interference mitigation resources for full-duplex communication in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, a message indicating a configuration of a set of time-frequency resources for a self-interference mitigation procedure, the set of time-frequency resources including periodic resources or semi-persistent resources, or both. The operations of 1805 may be performed in accordance with examples as disclosed herein. In some examples, aspects of the operations of 1805 may be performed by a configuration component 830 as described with reference to FIG. 8.

At 1810, the method may include receiving a first control message activating the set of time-frequency resources, where the one or more uplink transmissions are canceled in response to receiving the first control message activating the set of time-frequency resources. The operations of 1810 may be performed in accordance with examples as disclosed herein. In some examples, aspects of the operations of 1810 may be performed by a resource activation component 845 as described with reference to FIG. 8.

At 1815, the method may include canceling one or more uplink transmissions from the UE based on the configuration, where time-frequency resources associated with the one or more uplink transmissions at least partially overlap with the set of time-frequency resources. The operations of 1815 may be performed in accordance with examples as disclosed herein. In some examples, aspects of the operations of 1815 may be performed by a cancelation component 840 as described with reference to FIG. 8.

FIG. 19 shows a flowchart illustrating a method 1900 that supports adaptive self-interference mitigation resources for full-duplex communication in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include receiving a first message indicating a request for a set of time-frequency resources for a self-interference mitigation procedure at a UE. The operations of 1905 may be performed in accordance with examples as disclosed herein. In some examples, aspects of the operations of 1905 may be performed by a request manager 1225 as described with reference to FIG. 12.

At 1910, the method may include transmitting, in response to the first message, a second message indicating a configuration of the set of time-frequency resources based on the request. The operations of 1910 may be performed in accordance with examples as disclosed herein. In some examples, aspects of the operations of 1910 may be performed by a configuration manager 1230 as described with reference to FIG. 12.

At 1915, the method may include canceling one or more downlink transmissions based on the configuration, where time-frequency resources associated with the one or more downlink transmissions at least partially overlap with the set of time-frequency resources. The operations of 1915 may be performed in accordance with examples as disclosed herein. In some examples, aspects of the operations of 1915 may be performed by a cancelation manager 1235 as described with reference to FIG. 12.

FIG. 20 shows a flowchart illustrating a method 2000 that supports adaptive self-interference mitigation resources for full-duplex communication in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a message indicating a configuration of a set of time-frequency resources for performing a self-interference mitigation procedure, the set of time-frequency resources including periodic resources or semi-persistent resources, or both, where at least a portion of uplink transmissions from one or more user equipment (UEs) that overlap with the set of time-frequency resources are canceled based on the configuration. The operations of 2005 may be performed in accordance with examples as disclosed herein. In some examples, aspects of the operations of 2005 may be performed by a configuration manager 1230 as described with reference to FIG. 12.

At 2010, the method may include transmitting a self-interference measurement signal via the set of time-frequency resources. The operations of 2010 may be performed in accordance with examples as disclosed herein. In some examples, aspects of the operations of 2010 may be performed by a self-interference manager 1240 as described with reference to FIG. 12.

The following provides an overview of aspects of the present disclosure:

Aspect 1: A method of wireless communications at a UE, comprising: transmitting a first message indicating a request for a set of time frequency resources for performing a self-interference mitigation procedure; receiving, in response to the first message, a second message indicating a configuration of the set of time-frequency resources based at least in part on the request; and transmitting a self-interference measurement signal via the set of time-frequency resources based at least in part on the configuration.

Aspect 2: The method of aspect 1, wherein transmitting the self-interference measurement signal comprises: transmitting the self-interference measurement signal in accordance with a type of resources included in the set of time-frequency resources, the type of resources comprising periodic resources, semi-persistent resources, dynamic resources, or any combination thereof, and wherein the configuration indicates the type of resources.

Aspect 3: The method of aspect 2, wherein the type of resources comprises the semi-persistent resources, the method further comprising: receiving a first control message activating the set of time-frequency resources, wherein the self-interference measurement signal is transmitted based at least in part on the first control message activating the set of time-frequency resources.

Aspect 4: The method of aspect 3, further comprising: starting a timer in response to receiving the first control message activating the set of time-frequency resources; and deactivating the set of time-frequency resources based at least in part on an expiration of the timer.

Aspect 5: The method of any of aspects 3 through 4, further comprising: receiving a second control message deactivating the set of time-frequency resources.

Aspect 6: The method of aspect 2, wherein the type of resources comprises the dynamic resources, the method further comprising: transmitting a request for the set of time-frequency resources based at least in part on a state of the UE being modified from a first state to a second state that is different from the first state; and receiving, in response to the request, downlink control information comprising a resource grant for the set of time-frequency resources, wherein the self-interference measurement signal is transmitted in response to the resource grant.

Aspect 7: The method of any of aspects 1 through 6, wherein transmitting the self-interference measurement signal comprises: transmitting the self-interference measurement signal based at least in part on one or more resource indices corresponding to respective time-frequency resources of the set of time-frequency resources, wherein the configuration indicates the one or more resource indices.

Aspect 8: The method of any of aspects 1 through 7, further comprising: determining one or more configurations of the set of time-frequency resources that are supported by the UE for performing the self-interference mitigation procedure, wherein the first message indicates the one or more configurations.

Aspect 9: The method of any of aspects 1 through 8, further comprising: performing the self-interference mitigation procedure using one or more component carriers associated with a frequency region, the frequency region comprising one or more uplink frequency regions of a bandwidth, one or more downlink frequency regions of the bandwidth, or both, wherein the configuration indicates the frequency region.

Aspect 10: The method of aspect 9, wherein the self-interference measurement signal is transmitted via a first component carrier of the one or more component carriers, the method further comprising: performing measurements of the self-interference measurement signal via a second component carrier of the one or more component carriers based at least in part on the configuration.

Aspect 11: The method of any of aspects 1 through 10, further comprising: identifying a waveform and a transmit power for transmitting the self-interference measurement signal based at least in part on the configuration, wherein the self-interference measurement signal comprises the waveform and is transmitted using the transmit power.

Aspect 12: The method of any of aspects 1 through 10, further comprising: selecting a waveform for the self-interference measurement signal based at least in part on the configuration excluding an indication of the waveform, wherein the self-interference measurement signal comprises the waveform.

Aspect 13: The method of any of aspects 1 through 12, further comprising: receiving a first control message activating the set of time-frequency resources in response to a first event trigger, wherein the self-interference measurement signal is transmitted based at least in part on the first event trigger.

Aspect 14: The method of aspect 13, further comprising: receiving a second control message deactivating the set of time-frequency resources in response to a second event trigger.

Aspect 15: The method of any of aspects 13 through 14, wherein the first event trigger comprises one or beam pairs activated at the UE, a link quality measurement, or any combination thereof.

Aspect 16: The method of any of aspects 1 through 15, wherein transmitting the self-interference measurement signal comprises: transmitting the self-interference measurement signal in accordance with one or more time regions, a quantity of symbols, a periodicity, an offset value, or any combination thereof, wherein the configuration indicates the one or more time regions, the quantity of symbols, the periodicity, the offset value, or any combination thereof.

Aspect 17: The method of any of aspects 1 through 16, further comprising: identifying an uplink beam and a downlink beam associated with the set of time-frequency resources based at least in part on the configuration, the configuration indicating an uplink transmission configuration indicator state, an uplink spatial relation, a downlink transmission configuration indicator state, or any combination thereof, wherein the self-interference mitigation procedure is performed using the uplink beam and the downlink beam.

Aspect 18: The method of any of aspects 1 through 17, wherein the first message comprises a UE capability report, UE assistance information, a MAC control element, uplink control information, or any combination thereof.

Aspect 19: A method of wireless communications at a UE, comprising: receiving, from a network entity, a message indicating a configuration of a set of time-frequency resources for a self-interference mitigation procedure, the set of time-frequency resources comprising periodic resources or semi-persistent resources, or both; and canceling one or more uplink transmissions from the UE based at least in part on the configuration, wherein time-frequency resources associated with the one or more uplink transmissions at least partially overlap with the set of time-frequency resources.

Aspect 20: The method of aspect 19, wherein the set of time-frequency resources comprises the semi-persistent resources, the method further comprising: receiving a first control message activating the set of time-frequency resources, wherein the one or more uplink transmissions are canceled in response to receiving the first control message activating the set of time-frequency resources.

Aspect 21: The method of aspect 20, further comprising: starting a timer in response to receiving the first control message activating the set of time-frequency resources; and transmitting one or more additional uplink transmissions based at least in part on an expiration of the timer.

Aspect 22: The method of any of aspects 20 through 21, further comprising: receiving a second control message deactivating the set of time-frequency resources; and transmitting one or more additional uplink transmissions in response to receiving the second control message deactivating the set of time-frequency resources.

Aspect 23: The method of any of aspects 19 through 22, further comprising: determining that the set of time-frequency resources are activated based at least in part on one or more events, wherein the one or more uplink transmissions are canceled based at least in part on the set of time-frequency resources being activated.

Aspect 24: The method of aspect 23, wherein the one or more events comprise a beam change at the UE, an activation of one or more uplink beams, or both.

Aspect 25: The method of any of aspects 19 through 24, wherein canceling the one or more uplink transmissions comprises: canceling the one or more uplink transmissions based at least in part on a priority associated with each of the one or more uplink transmissions, the one or more uplink transmissions comprising a physical uplink shared channel transmission, a repetition of a physical uplink shared channel transmission, a physical uplink control channel, or any combination thereof.

Aspect 26: The method of any of aspects 19 through 25, wherein canceling the one or more uplink transmissions comprises: canceling the one or more uplink transmissions based at least in part on a transmission type of the one or more uplink transmissions.

Aspect 27: The method of aspect 26, wherein the transmission type comprises a semi-persistently scheduled physical uplink shared channel transmission, a dynamically-granted physical uplink shared channel transmission, a periodic sounding reference signal transmission, a semi-persistent sounding reference signal transmission, or any combination thereof.

Aspect 28: The method of any of aspects 19 through 27, wherein canceling the one or more uplink transmissions comprises: canceling the one or more uplink transmissions based at least in part on an application of the one or more uplink transmissions, the application comprising a codebook-based sounding reference signal or a non-codebook-based sounding reference signal, or both.

Aspect 29: The method of any of aspects 19 through 28, wherein canceling the one or more uplink transmissions comprises: canceling the one or more uplink transmissions based at least in part on a type of information included in each of the one or more uplink transmissions, the type of information comprising a scheduling request, hybrid automatic repeat request feedback, periodic channel state information, semi-persistent channel state information, or any combination thereof.

Aspect 30: The method of any of aspects 19 through 29, wherein canceling the one or more uplink transmissions comprises: canceling at least a portion of the one or more uplink transmissions based at least in part on the time-frequency resources at least partially overlapping with the set of time-frequency resources.

Aspect 31: The method of any of aspects 19 through 30, wherein canceling the one or more uplink transmissions comprises: performing rate matching around the set of time-frequency resources based at least in part on the configuration.

Aspect 32: The method of any of aspects 19 through 31, wherein the configuration of the set of time-frequency resources comprises an indication of one or more resource indices corresponding to respective time-frequency resources of the set of time-frequency resources, a type of resources included in the set of time-frequency resources, one or more time regions, one or more frequency regions, a periodicity, an offset value, one or more uplink beams associated with the set of time-frequency resources, or any combination thereof.

Aspect 33: A method of wireless communications at a network entity, comprising: receiving a first message indicating a request for a set of time frequency resources for a self-interference mitigation procedure at a UE; transmitting, in response to the first message, a second message indicating a configuration of the set of time-frequency resources based at least in part on the request; and canceling one or more downlink transmissions based at least in part on the configuration, wherein time-frequency resources associated with the one or more downlink transmissions at least partially overlap with the set of time-frequency resources.

Aspect 34: The method of aspect 33, wherein transmitting the second message comprises: transmitting the second message including an indication of a type of resources included in the set of time-frequency resources, the type of resources comprising periodic resources, semi-persistent resources, dynamic resources, or any combination thereof.

Aspect 35: The method of aspect 34, wherein the type of resources comprises the semi-persistent resources, the method further comprising: transmitting a first control message activating the set of time-frequency resources, wherein the one or more downlink transmissions are canceled based at least in part on the first control message activating the set of time-frequency resources.

Aspect 36: The method of aspect 35, further comprising: transmitting a second control message deactivating the set of time-frequency resources.

Aspect 37: The method of any of aspects 35 through 36, wherein the first control message activating the set of time-frequency resources is transmitted in response to a first event trigger, the first event trigger comprising one or beam pairs activated at the UE, a link quality measurement, or any combination thereof.

Aspect 38: The method of aspect 37, further comprising: transmitting a second control message deactivating the set of time-frequency resources in response to a second event trigger.

Aspect 39: The method of any of aspects 34 through 38, wherein the type of resources comprises the dynamic resources, the method further comprising: receiving a request for the set of time-frequency resources based at least in part on a state of the UE being modified from a first state to a second state that is different from the first state; and transmitting, in response to the request, downlink control information comprising a resource grant for the set of time-frequency resources, wherein the one or more downlink transmissions are canceled based at least in part on the resource grant.

Aspect 40: A method of wireless communications at a network entity, comprising: transmitting a message indicating a configuration of a set of time-frequency resources for performing a self-interference mitigation procedure, the set of time-frequency resources comprising periodic resources or semi-persistent resources, or both, wherein at least a portion of uplink transmissions from one or more user equipment (UEs) that overlap with the set of time-frequency resources are canceled based at least in part on the configuration; and transmitting a self-interference measurement signal via the set of time-frequency resources.

Aspect 41: The method of aspect 40, wherein the set of time-frequency resources comprises the semi-persistent resources, the method further comprising: transmitting a first control message activating the set of time-frequency resources, wherein the self-interference measurement signal is transmitted in response to transmitting the first control message activating the set of time-frequency resources.

Aspect 42: The method of aspect 41, further comprising: starting a timer in response to transmitting the first control message activating the set of time-frequency resources; and deactivating the set of time-frequency resources based at least in part on an expiration of the timer.

Aspect 43: The method of any of aspects 41 through 42, further comprising: transmitting a second control message deactivating the set of time-frequency resources.

Aspect 44: The method of any of aspects 40 through 43, further comprising: activating the set of time-frequency resources based at least in part on one or more events, wherein the self-interference measurement signal is transmitted based at least in part on the set of time-frequency resources being activated, the one or more events comprising a beam change at the UE, an activation of one or more uplink beams, or both.

Aspect 45: The method of any of aspects 40 through 44, wherein the configuration of the set of time-frequency resources comprises an indication of one or more resource indices corresponding to respective time-frequency resources of the set of time-frequency resources, a type of resources included in the set of time-frequency resources, one or more time regions, one or more frequency regions, a periodicity, an offset value, one or more uplink beams associated with the set of time-frequency resources, or any combination thereof.

Aspect 46: An apparatus comprising a processor; memory coupled with the processor; and instructions stored in the memory and executable by the processor to cause the apparatus to perform a method of any of aspects 1 through 18.

Aspect 47: An apparatus comprising at least one means for performing a method of any of aspects 1 through 18.

Aspect 48: A non-transitory computer-readable medium storing code the code comprising instructions executable by a processor to perform a method of any of aspects 1 through 18.

Aspect 49: An apparatus comprising a processor; memory coupled with the processor; and instructions stored in the memory and executable by the processor to cause the apparatus to perform a method of any of aspects 19 through 32.

Aspect 50: An apparatus comprising at least one means for performing a method of any of aspects 19 through 32.

Aspect 51: A non-transitory computer-readable medium storing code the code comprising instructions executable by a processor to perform a method of any of aspects 19 through 32.

Aspect 52: An apparatus comprising a processor; memory coupled with the processor; and instructions stored in the memory and executable by the processor to cause the apparatus to perform a method of any of aspects 33 through 39.

Aspect 53: An apparatus comprising at least one means for performing a method of any of aspects 33 through 39.

Aspect 54: A non-transitory computer-readable medium storing code the code comprising instructions executable by a processor to perform a method of any of aspects 33 through 39.

Aspect 55: An apparatus comprising a processor; memory coupled with the processor; and instructions stored in the memory and executable by the processor to cause the apparatus to perform a method of any of aspects 40 through 45.

Aspect 56: An apparatus comprising at least one means for performing a method of any of aspects 40 through 45.

Aspect 57: A non-transitory computer-readable medium storing code the code comprising instructions executable by a processor to perform a method of any of aspects 40 through 45.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
one or more memories storing processor-executable code; and
one or more processors coupled with the one or more memories and configured to execute the code to cause the UE to:
transmit a first message indicating a request for a set of time-frequency resources for performing a self-interference mitigation procedure;
receive, in response to the first message, a second message indicating a configuration of the set of time-frequency resources based at least in part on the request, the configuration indicating a type of resources included in the set of time-frequency resources and further indicating one or more time regions, a quantity of symbols, a periodicity, an offset value, or any combination thereof, wherein the type of resources comprises periodic resources, semi-persistent resources, dynamic resources, or any combination thereof; and
transmit a self-interference measurement signal via the set of time-frequency resources in accordance with the type of resources and in accordance with the one or more time regions, the quantity of symbols, the periodicity, the offset value, or any combination thereof based at least in part on the configuration.

2. The UE of claim 1, wherein the type of resources comprises the semi-persistent resources, and the one or more processors are further configured to execute the code to cause the UE to:
receive a first control message activating the set of time-frequency resources, wherein the self-interference measurement signal is transmitted based at least in part on the first control message activating the set of time-frequency resources.

3. The UE of claim 2, wherein the one or more processors are further configured to execute the code to cause the UE to:
start a timer in response to receiving the first control message activating the set of time-frequency resources; and
deactivate the set of time-frequency resources based at least in part on an expiration of the timer.

4. The UE of claim 2, wherein the one or more processors are further configured to execute the code to cause the UE to:
receive a second control message deactivating the set of time-frequency resources.

5. The UE of claim 1, wherein the type of resources comprises the dynamic resources, and the one or more processors are further configured to execute the code to cause the UE to:
transmit a request for the set of time-frequency resources based at least in part on a state of the UE being modified from a first state to a second state that is different from the first state; and
receive, in response to the request, downlink control information comprising a resource grant for the set of time-frequency resources, wherein the self-interference measurement signal is transmitted in response to the resource grant.

6. The UE of claim 1, wherein, to transmit the self-interference measurement signal, the one or more processors are further configured to execute the code to cause the UE to:
transmit the self-interference measurement signal based at least in part on one or more resource indices corresponding to respective time-frequency resources of the set of time-frequency resources, wherein the configuration indicates the one or more resource indices.

7. The UE of claim 1, wherein the one or more processors are further configured to execute the code to cause the UE to:
determine one or more configurations of the set of time-frequency resources that are supported by the UE for performing the self-interference mitigation procedure, wherein the first message indicates the one or more configurations.

8. The UE of claim 1, wherein the one or more processors are further configured to execute the code to cause the UE to:
perform the self-interference mitigation procedure using one or more component carriers associated with a frequency region, the frequency region comprising one or more uplink frequency regions of a bandwidth, one or more downlink frequency regions of the bandwidth, or both, wherein the configuration indicates the frequency region.

9. The UE of claim 8, wherein the self-interference measurement signal is transmitted via a first component carrier of the one or more component carriers, and the one or more processors are further configured to execute the code to cause the UE to:
perform measurements of the self-interference measurement signal via a second component carrier of the one or more component carriers based at least in part on the configuration.

10. The UE of claim 1, wherein the one or more processors are further configured to execute the code to cause the UE to:
identify a waveform and a transmit power for transmitting the self-interference measurement signal based at least in part on the configuration, wherein the self-interference measurement signal comprises the waveform and is transmitted using the transmit power.

11. The UE of claim 1, the one or more processors are further configured to execute the code to cause the UE to:
select a waveform for the self-interference measurement signal based at least in part on the configuration excluding an indication of the waveform, wherein the self-interference measurement signal comprises the waveform.

12. The UE of claim 1, the one or more processors are further configured to execute the code to cause the UE to:
receive a first control message activating the set of time-frequency resources in response to a first event trigger, wherein the self-interference measurement signal is transmitted based at least in part on the first event trigger.

13. The UE of claim 1, wherein the one or more processors are further configured to execute the code to cause the UE to:
identify an uplink beam and a downlink beam associated with the set of time-frequency resources based at least in part on the configuration, the configuration indicating an uplink transmission configuration indicator state, an uplink spatial relation, a downlink transmission configuration indicator state, or any combination thereof, wherein the self-interference mitigation procedure is performed using the uplink beam and the downlink beam.

14. A user equipment (UE) for wireless communications, comprising:

one or more memories storing processor-executable code; and one or more processors coupled with the one or more memories and configured to execute the code to cause the UE to:

receive, from a network entity, a message indicating a configuration of a set of time-frequency resources for a self-interference mitigation procedure, the set of time-frequency resources comprising periodic resources or semi-persistent resources, or both; and cancel one or more uplink transmissions based at least in part on the configuration, wherein time-frequency resources associated with the one or more uplink transmissions at least partially overlap with the set of time-frequency resources.

15. The UE of claim 14, wherein the set of time-frequency resources comprises the semi-persistent resources, and the one or more processors are further configured to execute the code to cause the UE to:

receive a first control message activating the set of time-frequency resources, wherein the one or more uplink transmissions are canceled in response to receiving the first control message activating the set of time-frequency resources.

16. The UE of claim 15, wherein the one or more processors are further configured to execute the code to cause the UE to:

start a timer in response to receiving the first control message activating the set of time-frequency resources; and transmit one or more additional uplink transmissions based at least in part on an expiration of the timer.

17. The UE of claim 15, wherein the one or more processors are further configured to execute the code to cause the UE to:

receive a second control message deactivating the set of time-frequency resources; and transmit one or more additional uplink transmissions in response to receiving the second control message deactivating the set of time-frequency resources.

18. The UE of claim 14, wherein the one or more processors are further configured to execute the code to cause the UE to:

determine that the set of time-frequency resources are activated based at least in part on one or more events, wherein the one or more uplink transmissions are canceled based at least in part on the set of time-frequency resources being activated, wherein the one or more events comprise a beam change at a user equipment (UE), an activation of one or more uplink beams, or both.

19. The UE of claim 14, wherein, to cancel the one or more uplink transmissions, the one or more processors are further configured to execute the code to cause the UE to:

cancel the one or more uplink transmissions based at least in part on a priority associated with each of the one or more uplink transmissions, the one or more uplink transmissions comprising a physical uplink shared channel transmission, a repetition of a physical uplink shared channel transmission, a physical uplink control channel, or any combination thereof.

20. The UE of claim 14, wherein, to cancel the one or more uplink transmissions, the one or more processors are further configured to execute the code to cause the UE to:

cancel the one or more uplink transmissions based at least in part on a transmission type of the one or more uplink transmissions, wherein the transmission type comprises a semi-persistently scheduled physical uplink shared channel transmission, a dynamically-granted physical uplink shared channel transmission, a periodic sounding reference signal transmission, a semi-persistent sounding reference signal transmission, or any combination thereof.

21. The UE of claim 14, wherein, to cancel the one or more uplink transmissions, the one or more processors are further configured to execute the code to cause the UE to:

cancel the one or more uplink transmissions based at least in part on an application of the one or more uplink transmissions, the application comprising a codebook-based sounding reference signal or a non-codebook-based sounding reference signal, or both.

22. The UE of claim 14, wherein, to cancel the one or more uplink transmissions, the one or more processors are further configured to execute the code to cause the UE to:

cancel the one or more uplink transmissions based at least in part on a type of information included in each of the one or more uplink transmissions, the type of information comprising a scheduling request, hybrid automatic repeat request feedback, periodic channel state information, semi-persistent channel state information, or any combination thereof.

23. The UE of claim 14, wherein, to cancel the one or more uplink transmissions, the one or more processors are further configured to execute the code to cause the UE to:

cancel at least a portion of the one or more uplink transmissions based at least in part on the time-frequency resources at least partially overlapping with the set of time-frequency resources.

24. The UE of claim 14, wherein, to cancel the one or more uplink transmissions, the one or more processors are further configured to execute the code to cause the UE to:

perform rate matching around the set of time-frequency resources based at least in part on the configuration.

25. A network entity for wireless communications, comprising:

one or more memories storing processor-executable code; and one or more processors coupled with the one or more memories and configured to execute the code to cause the network entity to:

receive a first message indicating a request for a set of time-frequency resources for a self-interference mitigation procedure at a user equipment (UE);

transmit, in response to the first message, a second message indicating a configuration of the set of time-frequency resources based at least in part on the request; and cancel one or more downlink transmissions based at least in part on the configuration, wherein time-frequency resources associated with the one or more downlink transmissions at least partially overlap with the set of time-frequency resources.

26. The network entity of claim 25, wherein, to transmit the second message, the one or more processors are further configured to execute the code to cause the network entity to:

transmit the second message including an indication of a type of resources included in the set of time-frequency resources, the type of resources comprising periodic resources, semi-persistent resources, dynamic resources, or any combination thereof.

27. A network entity for wireless communications, comprising:

one or more memories storing processor-executable code; and one or more processors coupled with the one or more memories and configured to execute the code to cause the network entity to:

transmit a message indicating a configuration of a set of time-frequency resources for performing a self-interference mitigation procedure, the set of time-frequency resources comprising periodic resources or semi-persistent resources, or both, wherein at least a portion of uplink transmissions from one or more user equipment (UEs) that overlap with the set of time-frequency resources are canceled based at least in part on the configuration; and transmit a self-interference measurement signal via the set of time-frequency resources.

28. The network entity of claim 27, wherein the set of time-frequency resources comprises the semi-persistent resources, and the one or more processors are further configured to execute the code to cause the network entity to:

transmit a first control message activating the set of time-frequency resources, wherein the self-interference measurement signal is transmitted in response to transmitting the first control message activating the set of time-frequency resources.

* * * * *